(12) United States Patent
Bullard et al.

(10) Patent No.: US 12,064,732 B2
(45) Date of Patent: Aug. 20, 2024

(54) METHODS AND RELATED APPARATUS FOR PROVIDING A PROCESSING SOLUTION FOR A FOOD PROCESSING APPLICATION

(71) Applicant: Zee Company, Inc., Chattanooga, TN (US)

(72) Inventors: Jonathon R. Bullard, Chattanooga, TN (US); James A. Faller, Chattanooga, TN (US); Robert C. Bullard, Signal Mountain, TN (US); Joe Guinn, Chattanooga, TN (US); Mason Bradford, Valley Head, AL (US)

(73) Assignee: Zeco, LLC, Chattanooga, TN (US)

( * ) Notice: Subject to any disclaimer, the term of this patent is extended or adjusted under 35 U.S.C. 154(b) by 515 days.

(21) Appl. No.: 17/207,248

(22) Filed: Mar. 19, 2021

(65) Prior Publication Data

US 2021/0205766 A1    Jul. 8, 2021

Related U.S. Application Data

(63) Continuation-in-part of application No. 15/676,622, filed on Aug. 14, 2017, now Pat. No. 11,350,640, and
(Continued)

(51) Int. Cl.
    *A23L 3/3454*    (2006.01)
    *A23B 4/12*      (2006.01)
    (Continued)

(52) U.S. Cl.
    CPC ............... *B01F 23/49* (2022.01); *A23B 4/12* (2013.01); *A23B 4/22* (2013.01); *A23L 3/34635* (2013.01);
(Continued)

(58) Field of Classification Search
None
See application file for complete search history.

(56) References Cited

U.S. PATENT DOCUMENTS

| | | |
|---|---|---|
| 2,347,434 A | 4/1944 | Reichert et al. |
| 2,377,038 A | 5/1945 | Reichert et al. |
| | (Continued) | |

FOREIGN PATENT DOCUMENTS

| | | |
|---|---|---|
| CA | 2569025 | 6/2008 |
| DK | 84296 C | 1/1958 |
| | (Continued) | |

OTHER PUBLICATIONS

Bauermeister, L.J. et al., "The Microbial and Quality Properties of Poultry Carcasses treated with Peracetic Acid as Antimicrobial Treatment", Department of Poultry Science, © Poultry Science Association, Inc. Received Feb. 23, 2008, Accepted Jun. 13, 2008, 9 pages.

(Continued)

*Primary Examiner* — Paul S Hyun
(74) *Attorney, Agent, or Firm* — DeWitt LLP

(57) ABSTRACT

Methods and related apparatus for providing a chemical intervention processing solution for use within processing tanks. Processing tanks can include side streams or ancillary systems for generating the chemical intervention processing solution that can then be introduced into the processing tanks. The antimicrobial agents will be added and mixed in the side stream to form the chemical intervention processing solution. Additional actions can be conducted on the processing solution within the side stream including any and or all of heating, pumping, sampling, measuring, testing and pH adjustment of the processing solution. The chemical intervention processing solution can also be provided by a venturi injector that combines processing water and an antimicrobial agent and/or an alkaline agent outside of the (Continued)

processing tank. The processing solution can be used for various food processing applications.

39 Claims, 11 Drawing Sheets

Related U.S. Application Data a continuation-in-part of application No. 15/436,210, filed on Feb. 17, 2017, now Pat. No. 10,974,211.

(60) Provisional application No. 62/374,468, filed on Aug. 12, 2016, provisional application No. 62/299,276, filed on Feb. 24, 2016, provisional application No. 62/296,373, filed on Feb. 17, 2016.

(51) Int. Cl.
| | | |
|---|---|---|
| *A23B 4/22* | (2006.01) | |
| *A23L 3/3463* | (2006.01) | |
| *A23L 3/3517* | (2006.01) | |
| *A61L 2/18* | (2006.01) | |
| *B01F 23/40* | (2022.01) | |
| *B01F 23/451* | (2022.01) | |
| *B01F 25/312* | (2022.01) | |
| *B01F 35/21* | (2022.01) | |
| *B01F 35/22* | (2022.01) | |
| *B01F 35/221* | (2022.01) | |
| *B01F 101/48* | (2022.01) | |

(52) U.S. Cl.
CPC .......... *A23L 3/3517* (2013.01); *B01F 23/451* (2022.01); *B01F 25/312* (2022.01); *B01F 35/2132* (2022.01); *B01F 35/2202* (2022.01); *B01F 35/2211* (2022.01); *A23V 2002/00* (2013.01); *B01F 23/483* (2022.01); *B01F 2101/48* (2022.01)

(56) References Cited

U.S. PATENT DOCUMENTS

| | | | |
|---|---|---|---|
| 2,512,640 | A | 6/1950 | Greenspan et al. |
| 2,966,415 | A | 12/1960 | Rinehart et al. |
| 3,104,170 | A | 9/1963 | Mahon et al. |
| 3,104,978 | A | 9/1963 | Elder |
| 3,122,417 | A | 2/1964 | Blaser et al. |
| 3,234,140 | A | 2/1966 | Irani et al. |
| 3,689,283 | A | 9/1972 | May et al. |
| 4,675,947 | A | 6/1987 | Clatfelter et al. |
| 5,069,922 | A | 12/1991 | Brotsky et al. |
| 5,139,788 | A | 8/1992 | Schmidt |
| 5,143,739 | A | 9/1992 | Bender et al. |
| 5,200,189 | A | 4/1993 | Oakes et al. |
| 5,208,057 | A | 5/1993 | Greenley |
| 5,234,703 | A | 8/1993 | Guthery |
| 5,283,073 | A | 2/1994 | Bender et al. |
| 5,364,650 | A | 11/1994 | Guthery |
| 5,435,808 | A | 7/1995 | Holzhauer et al. |
| 5,462,713 | A | 10/1995 | Schlitzer et al. |
| 5,489,434 | A | 2/1996 | Oakes et al. |
| 5,567,444 | A | 10/1996 | Hei et al. |
| 5,597,791 | A | 1/1997 | Richards et al. |
| 5,632,676 | A | 5/1997 | Kurschner et al. |
| 5,635,231 | A | 6/1997 | Bender et al. |
| 5,674,538 | A | 10/1997 | Lokkesmoe et al. |
| 5,718,910 | A | 2/1998 | Oakes et al. |
| 5,720,983 | A | 2/1998 | Malone |
| 5,863,244 | A | 1/1999 | Mansfield |
| 5,965,033 | A | 10/1999 | Huss et al. |
| 6,008,405 | A | 12/1999 | Gray et al. |
| 6,010,729 | A | 1/2000 | Gutzmann et al. |
| 6,095,675 | A * | 8/2000 | Tai ...................... B01F 25/312 137/890 |
| 6,103,286 | A | 8/2000 | Gutzmann et al. |
| 6,113,963 | A | 9/2000 | Gutzmann et al. |
| 6,183,807 | B1 | 2/2001 | Gutzmann et al. |
| 6,284,719 | B1 | 9/2001 | Simms |
| 6,342,528 | B1 | 1/2002 | McKenzie et al. |
| 6,455,086 | B1 | 9/2002 | Trinh et al. |
| 6,514,556 | B2 | 2/2003 | Hilgren et al. |
| 6,518,419 | B1 | 2/2003 | Van Der Lugt et al. |
| 6,527,872 | B1 | 3/2003 | Fricker et al. |
| 6,534,075 | B1 | 3/2003 | Hei et al. |
| 6,545,047 | B2 | 4/2003 | Gutzmann et al. |
| 6,558,620 | B1 | 5/2003 | Sanford et al. |
| 6,582,961 | B1 | 6/2003 | Moon et al. |
| 6,605,253 | B1 | 8/2003 | Perkins |
| 6,627,593 | B2 | 9/2003 | Hei et al. |
| 6,627,657 | B1 | 9/2003 | Hilgren et al. |
| 6,964,788 | B2 | 11/2005 | Phebus et al. |
| 7,077,967 | B2 | 7/2006 | Perkins et al. |
| 7,387,736 | B2 | 6/2008 | Phillips et al. |
| 7,470,655 | B2 | 12/2008 | Biering et al. |
| 7,498,051 | B2 | 3/2009 | Man et al. |
| 7,754,670 | B2 | 7/2010 | Lange et al. |
| 7,767,240 | B2 | 8/2010 | Howarth |
| 7,832,360 | B2 | 11/2010 | Hilgren et al. |
| 7,887,641 | B2 | 2/2011 | Man et al. |
| 8,020,520 | B2 | 9/2011 | Hilgren et al. |
| 8,029,693 | B2 | 10/2011 | Dada et al. |
| 8,030,351 | B2 | 10/2011 | Gutzmann et al. |
| 8,043,650 | B2 | 10/2011 | Gutzmann et al. |
| 8,057,812 | B2 | 11/2011 | Man et al. |
| 8,128,976 | B2 | 3/2012 | Man et al. |
| 8,246,758 | B2 | 8/2012 | Man et al. |
| 8,372,461 | B2 | 2/2013 | Bullard et al. |
| 8,877,254 | B2 | 11/2014 | Li et al. |
| 8,916,510 | B2 | 12/2014 | Gutzmann et al. |
| 9,414,609 | B1 | 8/2016 | Bullard et al. |
| 9,497,964 | B2 | 11/2016 | Dagher et al. |
| 10,912,321 | B2 | 2/2021 | Harvey et al. |
| 10,974,211 | B2 | 4/2021 | Beason et al. |
| 11,350,640 | B1 | 6/2022 | Bullard et al. |
| 11,659,844 | B1 | 5/2023 | Bullard et al. |
| 2001/0044401 | A1 | 11/2001 | Perkins et al. |
| 2002/0072627 | A1 | 6/2002 | Chandalia et al. |
| 2002/0083549 | A1 | 7/2002 | Dieterman et al. |
| 2003/0047087 | A1 | 3/2003 | Phebus et al. |
| 2003/0148727 | A1 | 8/2003 | Hilgren et al. |
| 2003/0180385 | A1 | 9/2003 | Martinelli et al. |
| 2003/0199583 | A1 | 10/2003 | Gutzmann et al. |
| 2003/0200997 | A1 | 10/2003 | Gill et al. |
| 2003/0211169 | A1 | 11/2003 | Tabasso |
| 2005/0209120 | A1 | 9/2005 | Reinhardt et al. |
| 2005/0245416 | A1 | 11/2005 | Veening et al. |
| 2006/0113506 | A1 | 6/2006 | Man et al. |
| 2006/0225439 | A1 | 10/2006 | Morris, III et al. |
| 2006/0286227 | A1 | 12/2006 | Terry |
| 2007/0025897 | A1 | 2/2007 | Rheingans et al. |
| 2007/0244261 | A1 | 10/2007 | Fukui et al. |
| 2007/0269563 | A1 | 11/2007 | Mixon et al. |
| 2007/0292580 | A1 | 12/2007 | Gutzmann et al. |
| 2009/0043123 | A1 | 2/2009 | Copenhafer et al. |
| 2009/0143481 | A1 | 6/2009 | Man et al. |
| 2009/0145859 | A1 | 6/2009 | Man et al. |
| 2009/0282847 | A1 | 11/2009 | Bullard et al. |
| 2009/0311134 | A1 | 12/2009 | Iwashita et al. |
| 2009/0324790 | A1 | 12/2009 | Hilgren et al. |
| 2010/0021557 | A1 | 1/2010 | Li et al. |
| 2010/0075883 | A1 | 3/2010 | Geret et al. |
| 2010/0092574 | A1 | 4/2010 | Sweeny |
| 2010/0108942 | A1 | 5/2010 | Man et al. |
| 2010/0196503 | A1 | 8/2010 | Heisig et al. |
| 2010/0227000 | A1 | 9/2010 | Ames et al. |
| 2010/0323037 | A1 | 12/2010 | Curry et al. |
| 2011/0027383 | A1 | 2/2011 | Hilgren et al. |
| 2011/0135534 | A1 | 6/2011 | Bates et al. |
| 2011/0177145 | A1 | 6/2011 | Erkenbrecher, Jr. et al. |
| 2011/0220155 | A1 | 9/2011 | Man et al. |
| 2011/0274766 | A1 | 11/2011 | Allen et al. |
| 2011/0305805 | A1 | 12/2011 | Gutzmann et al. |
| 2011/0311691 | A1 | 12/2011 | Gutzmann et al. |

(56) References Cited

U.S. PATENT DOCUMENTS

| | | |
|---|---|---|
| 2012/0165407 A1 | 6/2012 | Gupta et al. |
| 2012/0244261 A1 | 9/2012 | Harvey et al. |
| 2012/0245228 A1 | 9/2012 | Harvey et al. |
| 2012/0322872 A1 | 12/2012 | Krauss et al. |
| 2013/0153516 A1 | 6/2013 | Bullard et al. |
| 2013/0251819 A1 | 9/2013 | Knueven et al. |

FOREIGN PATENT DOCUMENTS

| | | |
|---|---|---|
| EP | 0564250 A2 | 10/1993 |
| EP | 0564250 A3 | 10/1993 |
| EP | 0550137 | 12/1996 |
| EP | 0985349 | 3/2000 |
| EP | 1199931 | 7/2003 |
| EP | 1435203 | 7/2004 |
| GB | 947688 | 1/1964 |
| GB | 1456592 | 11/1976 |
| GB | 2289676 | 11/1995 |
| JP | H08165298 | 6/1996 |
| WO | WO9406294 | 3/1994 |
| WO | WO9421122 | 9/1994 |
| WO | WO9424869 | 11/1994 |
| WO | WO9742984 | 11/1997 |
| WO | WO 99/00025 | 1/1999 |
| WO | WO0105255 | 1/2001 |
| WO | WO0237972 | 5/2002 |
| WO | WO 02/054866 | 7/2002 |
| WO | WO02060280 | 8/2002 |
| WO | WO03092919 | 11/2003 |
| WO | WO2006015626 | 2/2006 |
| WO | WO 2007/092087 | 8/2007 |
| WO | WO 2009/027857 | 3/2009 |
| WO | WO2009156972 | 12/2009 |
| WO | WO2012037294 | 3/2012 |

OTHER PUBLICATIONS

Li, Junzhong et al., File History of U.S. Appl. No. 61/427,952, filed Dec. 29, 2010, titled "In Situ Generation of Peroxycarboxylic Acids at Alkaline pH, and Methods of Use Thereof".

Alvarado, C. et al., "Marination to Improve Functional Properties and Safety of Poultry Meat", Department of Animal and Food Sciences, © 2007 Poultry Science Association, Inc. 15 pages.

Yuan, Z. et al., "Kinetic of Peracetic Acid Decomposition Part 1: Spontaneous Decomposition at Typical Pulp Bleaching Conditions", The Canadian Journal of Chemical Engineering. vol. 75, Feb. 1997, 6 pages.

Baldry, M.G.C. et al., "The Activity of Peracetic Acid in Sewage Indicator Bacteria and Viruses", Wat.Sci. Tech, vol. 24, No. 2, pp. 353-357, © 1991.

Ercken,D. et al.,, "Effects of Peracetic Acid and Monochloramine on the Inactivation of Naegleria Lovaniensis", Water Science Technology, vol. 47, No. 3, pp. 167-171, © 2003.

Schmidt, Ronald H., "Basic Elements of Equipment Cleaning and Sanitizing in Food Processing and Handling Operations", University of Florida, 11 pages, Publication FS14, Dec. 12, 2018.

Artes, F. et al., "Improved Strategies for Keeping Overall Quality of Fresh-cut Produce", Proc. IC on Qual. Manag, Fresh Cut Produce, 2007, pp. 245-258.

Chandra, Sofia Santí, "Effects of Low-dose Gamma Irradiation. Chlorine, and Peroxyacetic Acid (PAA) on Fresh Sliced Radish", A Research Project, Submitted to the Graduate Faculty of Chapman University, Aug. 2004. 56 pages.

Ernst, C. et al., "Efficacy of Amphoteric Surfactant- and Peracetic Acid-Based Disinfectants on Spores of Bacillus cereus In Vitro and on Food Premises of the German Armed Forces", Journal of Food Protection. vol. 69, No. 7, pp. 1605-1610, 2006.

Rodrigues, Laura Beatriz, et al., "Quantification of Biofilm Production on Polystyrene by Listeria, Escherichia coli and Staphylococcus aureus Isolated From a Poultry Slaughterhouse", Brazilian Journal of Microbiology (2010) 41:1082-1085.

Sánchez-Ruiz, Concepción, et al., "An Evaluation of the Efficiency and Impact of Ray Wastewater Disinfection with Peracetic Acid Prior to Ocean Discharge", Wat. Sci. Tech. vol. 32, No. 7 pp. 159-166, 1998.

Trachoo, Nathanon, "Survival of Campylobacter jejuni in Biofilms Isolated from the Water System of a Chicken House", A Dissertation submitted to the Graduate Faculty of The University of Georgia in Partial Fulfillment of t he Requirements for gree Doctor of Philosophy, Athens, Georgia, 2001.

Vij, Shilpa, "New Sanitation Technologies", pp. 125-128 from Lecture Compendium: Advances in Cleaning a Food Industry, The Seventeenth Short Course, Centre of Advanced Studies, Division of Dairy Technology, National Dairy Research Institute, Mar. 3-23, 2004.

Bauermesiter, Laura J., et al., "Validating the Efficacy of Peracetic Acid Mixture as an Antimicrobial of Poultry Chillers", J. Food. Prot., vol. 71, No. 6,. pp. 1119-1122, 2008.

Howarth, Jon, "PERASAN® Efficacy Against Listeria monocytogenes and E. coli in 15% Salt Brine Solutions of 40° F.", EnviroTech, Feb. 15, 2005,4 pages.

Baert, Leen, et al., "Efficacy of Sodium Hypochlorite and Peroxyacetic Acid to Reduce Murine Norovirus 1, B40-8, Listeria monocytogenes, and Excherichia coli O157:H7 on Shredded Iceberg Lettuce and in Residual Wash Water", Journal of Food Protection, vol. 27, No. 5 (2009), pp. 1047-1054.

Baldry, M.G.C., "The Bactericidal, Fungicidal and Sporicidal Properties of Hydrogen Peroxide and Peracetic Acid", Journal of Applied Bacteriology, pp. 417-423, 1983.

Burfoot, Dean, et al., "Reducing Microbial Counts on Chicken and Turkey Carcasses Using Lactic Acid", ScienceDirect, Food Control 22 (2011) pp. 1729-1735.

Dickens, J.A., et al., "Effects of Acetic Acid and Hydrogen Peroxide Application During Defeathering on the Microbiological Quality of Broiler Carcasses Prior to Evisceration", Poultry Science 76:657-660 (1997).

Dickens, J.A., et al., "The Effects of Extended Chilling Times with Acetic Acid on the Temperature and Microbiological Quality of Processed Poultry Carcasses", Processing and Products, Poultry Science 74:1044-1048 (1995).

Dorsa, Warren J., et al., "Long-Term Bacterial Profile of Refrigerated Ground Beef Made from Carcass Tissue, Experimentally Contaminated with Pathogens and Spoilage Bacteria after Hot Water Alkaline, or Organic Acid Washes", Journal of Food Protection, vol. 61, No. 12 pp. 1615-1622 (1998).

foodsmatter.com.,www.foodsmatter.com/miscellaneous_articlesmisc_ articles/research/bleach_and_vinegar.html, "Improving Bleach's Bug-killing Potential", First published in Jul. 2009.

Gill, C.O., et al., "Effects of Peroxyacetic Acid, Acidified Sodium Chlorite or Lactic Acid Solutions on the Microflora of Chilled Beef Carcasses", International Journal of Food Microbiology 91 (2004) pp. 43-50.

Kemp, G. Kere, et al., "Acidified Sodium Chlorite Antimicrobial Treatment of Boiler Carcasses", Journal of Food Protection, vol. 63, No. 8 (2000) pp. 1087-1092.

Lillard, H.S., "Effect of Trisodium Phosphate of Salmonellae Attached to Chicken Skin", Journal of Food Protection, vol. 57, No. 6, pp. 465-469, Jun. 1994.

Peracetic Acid Technical Report, Peracetic Acid Processing, CAS No. 79-21-0, NOSB TAP Review Compiled by OMRI, Last updated Nov. 3, 2000 (7 pages).

Zeco, LLC, d/b/a Zee Company v. Enviro Tech Chemical Services, Inc., Amended Complaint for Declaratory Judgement in the United States Direct Court Eastern Direct of Tennessee at Chattanooga, Case No. 1:21-cv-00079-CEA-CHS, Document 95, filed Aug. 30, 2022, 21 pages.

Simpson, Catherine A. et al. "Antimicrobial Ingredients" Chapter 14 from Ingredients in Meat Products, pp. 301-377 (2009).

Bottemiller, Helena, "Russia Agrees to Lift Ban on U.S. Poultry Imports", Jun. 25, 2010. https://www.foodsafetynews.com/2010/06/russia-agrees-to-lift-ban-on-us-poultry-imports/.

Young et al., Moisture Retention by Water-and Air-Chilled Chicken Broilers During Processing and Cutup Operations; 2004, pp. 119-122, Poultry Science Association, Inc.

(56) References Cited

OTHER PUBLICATIONS

May et al., Effect of Phosphate Treatment on Carcass-Weight Changes and Organoleptic Quality of Cup-Up-Chicken; 1962, pp. 24-32, University of Georgia, and Market Quality Research Division, AMS, USDA Georgia.

Bell, "Reduction of doodborne mirco-organisms on beef carcass tissue using acetic acid, sodium bicarbonate, and hydrogen peroxide spray washes", Food Microbiology (1997), 14, 439-448.

Carciofi et al., "Water uptake by poultry carcasses during cooling by water immersion", Chemical Engineering and Processing: Process Intensification, vol. 46, No. 5, 2007, pp. 444-450.

Dorn, "Examination of *Salmonella* Decontamination of Broiler Carcasses", 1988, 28 pages.

Gusev, "Peracetic Acid for Salmonella Decontamination in Poultry Carcasses", Veterinary Disease Control Review (2007), 4 pages.

Harris et al., "Microbiological and organoleptic characteristics of beef trim and ground beef treated with acetic acid, lactic acid, acidified sodium chlorite, or sterile water in a simulated commercial processing environment to reduce *Escherichia coli* O157:H7 and *Salmonella*", Meat Science, 90, 2012, pp. 783-788.

Joseph, "Meat Decontamination", University of Bristol (1997), pp. 1, 8-9, 12, 33-35, 38, 43, 64-91, 98-99 and 104-105.

Labadie, "Development of a New Technique for Obtaining Axenic Meat", European J. Appl. Microbiol. (1977), 4, 67-73.

Mohan et al. "Role of Peroxyacetic Acid, Octanoic Acid, Malic Acid, and Potassium Lactate on the Microbiological and Instrumental Color Characteristics of Ground Beef", J. Food Science, vol. 77, No. 4, 2012, pp. M188-M193.

Nationalchickencouncil.org (Food Safety and Inspection in the U.S. Broiler Chicken Industry).

Quilo et al., "Microbial, instrumental color and sensory characteristics of inoculated ground beef produced using potassium lactate, sodium metasilicate or peroxyacetic acid as multiple antimicrobial interventions", Meat Science, 84, 2010, pp. 470-476.

Russell, "Solving the Yield/Pathogen Reduction Dilemma", Watt 290 Poultry USA, Oct. 2007, pp. 30-34.

Application and File History for U.S. Appl. No. 15/676,622 (now U.S. Pat. No. 11,350,640) filed Aug. 14, 2017, inventors Bullard et al.

Application and File History for U.S. Appl. No. 17/805,263 (now U.S. Pat. No. 11,659,844) filed Jun. 3, 2022, inventors Bullard et al.

Application and File History for U.S. Appl. No. 15/436,210 (now U.S. Pat. No. 10,974,211) filed Feb. 17, 2017, Beason et al.

Application and File History for U.S. Appl. No. 17/196,587, filed Mar. 9, 2021, inventors Beason et al.

\* cited by examiner

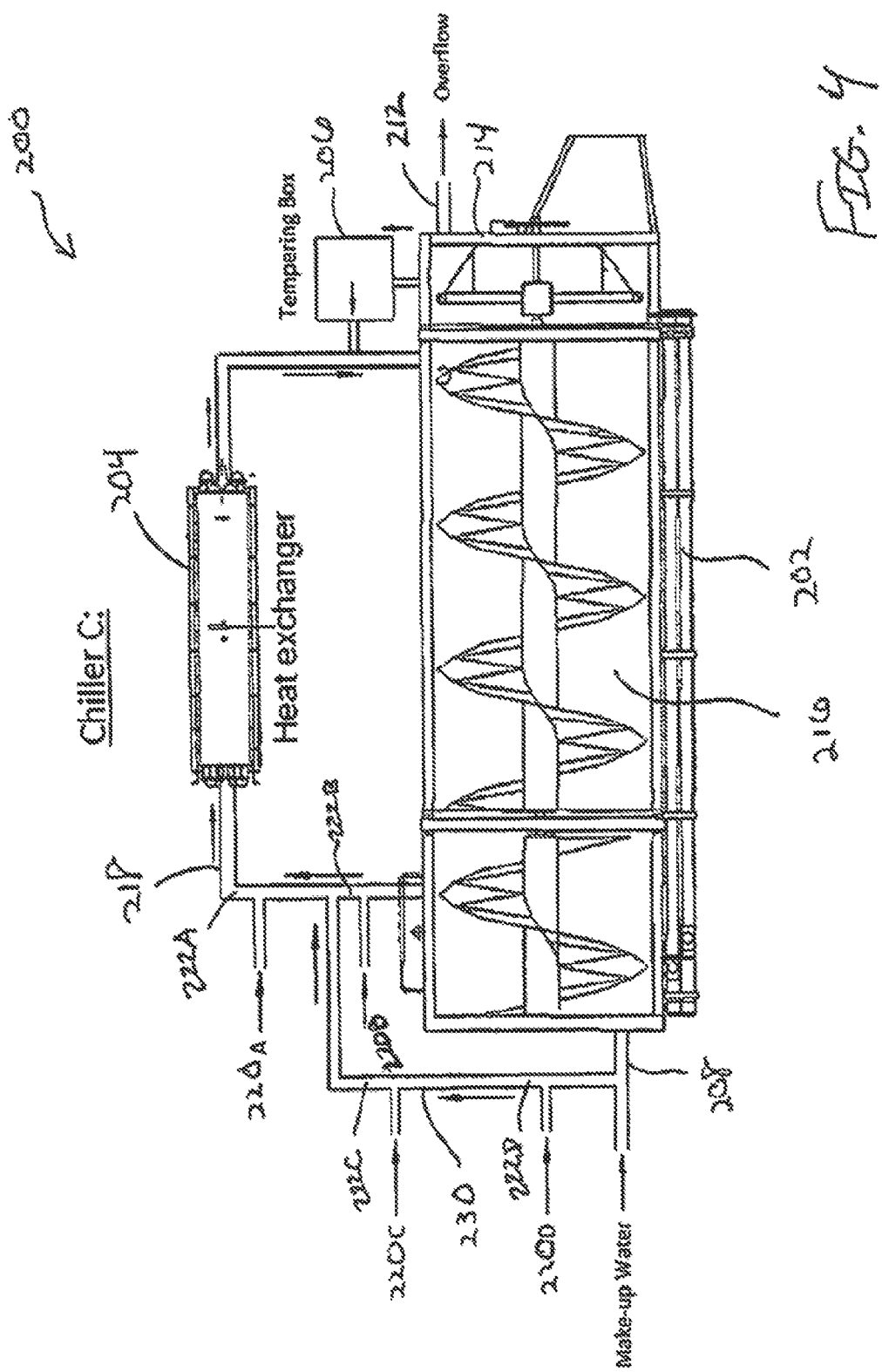

METHODS AND RELATED APPARATUS FOR PROVIDING A PROCESSING SOLUTION FOR A FOOD PROCESSING APPLICATION

PRIORITY CLAIM

The present application is also a continuation-in-part to U.S. patent application Ser. No. 15/676,622 filed Aug. 14, 2017, which claims priority to U.S. Provisional Application No. 62/374,468 filed Aug. 12, 2016, which are hereby incorporated by reference in its entirety.

The present application is a continuation-in-part to U.S. patent application Ser. No. 15/436,210 filed Feb. 17, 2017, which claims priority to U.S. Provisional Application No. 62/296,373, filed Feb. 17, 2016, and U.S. Provisional Application No. 62/299,276, filed Feb. 24, 2017, which are hereby incorporated by reference in its entirety.

TECHNICAL FIELD

The present invention is related to processing systems and related methods of operation during food processing, particularly poultry processing. More specifically, the present invention is directed to methods and related apparatus for increasing antimicrobial efficacy of a chemical intervention processing solution during poultry processing by providing a desired antimicrobial concentration and pH to the processing solution and reducing concentration gradients of antimicrobial agents within a processing tank.

BACKGROUND

The world population has grown to point where mass production of the foods that we consume is no longer a luxury but a requirement. Local farmers, providing food and food products directly to the marketplace, cannot meet the demands of modern society. The food supply chain now incorporates very large, complex farms and high speed and very high volume processing plants to satisfy the need for mass processing and production of food. Maintaining a safe food supply chain relies on the dedication of those working in the supply chain, the processing plants and also on the third party oversight of various Federal agencies whose regulations support and mandate food safety.

With two major exceptions, the physical process of taking an animal from the farm to the consumer has changed very little over time. The introduction of refrigeration, and the implementation of various chemistries to help maintain sanitary conditions and to control microbiology, has given modern food processors an advantage not enjoyed by food producers of a century ago. Refrigeration and chemical intervention practices have become an integral part of food processing facility operations. These technologies have enabled the high speed, high volume output of the large processing facilities that could not have been possible in times past without significant concern for consumer safety. With large scale and continuous processing methods being employed by large processors of protein products, or any other product that is susceptible to microbiological contamination, the concern for the control of microbiology and the safety of the food supply chain is of paramount importance.

One of the main concerns in slaughtering and processing plants is unwanted microorganisms that are emitted into the air or are contained on the animal carcass when the animal is processed, such as four-legged animals or red meat (i.e., beef, pork, etc.) and poultry (i.e., turkey, duck and chicken) during shackling, killing, scalding, and picking areas. The microorganisms that may become airborne or contained on the animal carcass are unwanted in the processing and packing areas of the plant because they can affect product quality and safety. They also pose a potential threat to the health and well-being of the workers in the plant. Still further, such microorganisms can affect down-field processes in a processing plant, posing quality and safety concerns to the ultimate consumer of the poultry product.

Commercial poultry processing plants include variety of processing and handling steps that can allow for the retention, transportation and transfer of bacteria from carcass to carcass throughout the processing plant. Of particular concern are human pathogenic microorganisms and those whose metabolism result in rapid spoilage of meat. These microorganisms, brought into the plant in or on live carcasses, are disseminated throughout the plant as the post-kill carcasses are handled by processing personnel, touch briefly together during traverse of the shackle lines, or are dipped for periods of time in various aqueous solutions, like scald baths and chill water.

In response to the presence of bacteria, most processing plants have implemented various processes that expose red meat and poultry carcasses to desirable antimicrobial chemistries in order to reduce bacterial populations on the carcasses. While prior chemistries including sodium hypochlorite, trisodium phosphate, various organic acids, ozone, chlorine dioxide and acidified sodium provided benefits, these older technologies suffered from undesirable effects and limitations. Newer antimicrobial chemistries include the use of peroxycarboxylic acids ("PCA"), such as peroxyacetic acid ("PAA"). PAA is a highly efficacious antimicrobial that was originally used as a hard surface sanitizer, but has more recently been recognized as possessing superior antimicrobial intervention chemistries for poultry carcasses. PAA provides a broad spectrum of kill of pathogenic and spoilage bacteria while producing no undesirable chemical by-products as the PAA degrades.

PAA, which is also sometimes called peracetic acid, is a peroxycarboxylic acid and is a well known chemical for its strong oxidizing potential, has the molecular formula $CH_3COOOH$, and has a molecular structure as follows:

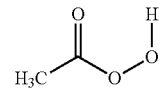

An equilibrium PAA solution is produced from an equilibrium mixture of hydrogen peroxide, acetic acid and water ("equilibrium PAA solution"), which often uses an acid catalyst, e.g., sulfuric acid.

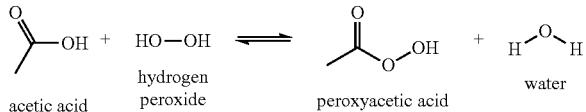

PAA has a pKA of about 8.4, such that about half the PAA is active (free) and about half is dissociated (bound) at a pH of about 8.4. For example, a 100 ppm solution of PAA at a pH of about 8.4 has about 50 ppm of active (free) PAA and about 50 ppm of peracetate ion, which is about 5 to about 10 times less effective than active PAA.

U.S. Pat. No. 5,632,676, which pertains to the application of equilibrium PAA solutions to fowl at an application concentration of about 100 ppm to about 2000 ppm, discloses such equilibrium solutions having a pH around 3.

Hydrogen peroxide is always present in excess in the natural equilibrium formulation of PAA solutions (and other equilibrium PCA solutions). Both the excess hydrogen peroxide and the PCA produced in the equilibrium PCA solution (such as PAA) are the sources of the oxidative chemistry that can create undesirable organoleptic effects on poultry skin and flesh, such as extremity darkening and skin bleaching. To mitigate the development of these undesirable effects, processing plants have reduced either concentrations of equilibrium PAA solutions (and other equilibrium PCA solutions) or restricted contact times.

U.S. Pat. No. 5,632,676 includes numerous examples of equilibrium PAA solutions and concludes that the examples show that effective sanitation occurs within a narrow peracetic acid concentration range. This patent also discusses bleaching that is apparent in unadjusted or NaOH adjusted PAA solutions compared to a solution adjusted to pH 5 with disodium phosphate. Published Patent Application No. 2012/0244261 also discusses providing a solution of PAA-containing water in a reservoir, measuring the pH in the reservoir, and then pH adjustment before processing with a source of alkali, pH determination in the reservoir during processing with pH adjustment as necessary during processing with a source of alkali to increase the weight of the processed poultry product, with the alkali adjusted PAA solutions having a pH between about 6 to about 9 in the processing reservoir before processing begins and during the processing.

Because of the importance of pH in driving the equilibrium equation to proper concentrations of PAA, it would be advantageous to improve upon the accuracy of pH measurement and consistency within of pH within the processing systems. It would also be advantageous to properly monitor and maintain the pH of PAA during processing to determine the proper active PAA compared to peracetate ions in the solution during processing. Further, due to the amount of organic material in the processing tank, it would be advantageous to have accurate monitoring of the pH of the processing solution without having to routinely clean the pH probes that can be fouled by the organic material. Still further, it would be advantageous to improve upon existing processing systems so as to reduce concentration gradients across a processing tank, as well as to increase the antimicrobial efficacy of intervention processing solutions in processing tanks. It would further be advantageous to improve upon existing processing systems by providing a processing solution having a desired concentration and a desired pH prior to the processing solution being introduced into a processing tank, such that the use of concentration and/or pH probes is optional or unnecessary. These and other advantages of the present invention will be evident by the written disclosure, drawings and claimed invention.

SUMMARY

Various aspects of the present invention include both methods and related apparatus as well as systems for improving the efficacy of chemical intervention processing solutions having one or more antimicrobial agents within processing tanks. Typically, methods, apparatus and systems of the present invention will involve the use of side streams to add appropriate antimicrobial agents and/or alkaline agents into the processing tanks. Within these side streams, the antimicrobial agents and/or alkaline agents will be added to a source solution and mixed to form a chemical intervention processing solution within the side stream. In some embodiments, the source solution is fresh water, while in some other embodiments the source solution may be a recycled, reclaimed and/or reused processing solution comprising one or more intervention solution components, such as a peroxycarboxylic acid, PAA, sodium hypochlorite or other processing chemistries. Depending upon the application, additional actions can be conducted on the processing solution within the side stream including any and or all of heating, for example, with heat exchangers, pumping, sampling, measuring, testing and/or pH adjusting the processing solution.

In some aspects, the present invention may generally further comprise the processing solution having at least two distinct streams, for example, a first and second processing solution stream, wherein the at least two distinct streams will be introduced at two different and distinct locations within the processing tank. For instance, the first processing solution stream can be introduced proximate a carcass introduction location of the processing tank, while the second processing solution stream can be simultaneously introduced at a carcass removal location of the processing tank. In some embodiments, the first and second processing streams are provided by separate processing stream sources. For instance, the first processing stream may be a source of fresh water mixed with an intervention chemistry, while the second processing stream may be a recycled, reclaimed or reused processing source mixed with an intervention chemistry. In some other embodiments, a single processing solution is provided that can be divided into the first and second processing streams. In some embodiments, the processing solution can be divided into additional streams that can be introduced at various locations between the carcass introduction location and the carcass removal location of the processing tank. By simultaneously introducing at least two processing solution streams at different locations of the processing tank, large concentration gradients can be avoided with the processing tank such that each animal carcass is exposed to sufficient amounts of the antimicrobial agent across a length of the processing tank. Furthermore, reduced amounts of antimicrobial agent can be utilized as there is no longer the necessity to add excessive amounts of the antimicrobial agent at an upstream side of the processing tank to ensure that adequate levels of the antimicrobial agent are present at the downstream side. Various aspects of the present invention have been found to be especially useful when the processing tank comprises a poultry chiller tank for cooling poultry carcasses.

In another aspect, the present invention improves upon pH control and consistency within processing systems having an antimicrobial solution by adding a pH adjusting product and/or peroxycarboxylic acids, such as PAA, to the inlet piping system or to a tank in a side or ancillary system, such that the pH adjusting product is thoroughly mixed with the peroxycarboxylic acid prior to its introduction into a processing tank system, such as a chiller tank.

In some embodiments, the ancillary system can comprise one or more of the various piping of the processing tank system, for example, inlet flow piping, makeup flow piping, and tank recirculation piping. In such aspects, the processing water can have a pH between about 7 and 12 prior to addition of the peroxycarboxylic acid, in other aspects a pH between about 7.5 and 9. Once the peroxycarboxylic acid is added to the processing water, the solution is thoroughly mixed before pH determination and introduction of the processing solution into the processing tank.

In some other embodiments, the ancillary system can comprise one or more stand-alone tanks, for example, a mixing tank or similar reservoir, which supplies the processing solution having the desired pH to the processing tank system. Through the mixing of the processing water with the peroxycarboxylic acid and pH determination in an ancillary system, pH need only be measured once (in the ancillary system) as the velocity of the water in the ancillary system (either piping or stand-alone mixing tank) and the associated high Reynolds number, resulting in the processing solution having the desired pH between about 7 and about 12, in some other instances between about 7.5 and 11, and other instances between about 8.0 and 10.0, being thoroughly mixed prior to being introduced into the process tank. As all of the water entering the tank (either incoming, rinse, or recirculation) is at the same pH, consistent pH contacts each poultry carcass as the birds travel from a front end to a back end of the processing tank.

In some embodiments, the pH of the processing solution can also be determined in the overflow of the processing tank. As all of the water entering the tank travels from the front end to the back end of the processing tank, the overflow at the back end of the processing tank will provide an accurate pH determination after the carcasses travel the entire distance of the processing tank. In other words, determining the pH of the processing solution after it exits the processing tank will provide a more accurate determination of the pH than in the tank itself where processing has not been completed or organic material can build-up.

In some embodiments, the ancillary system can comprise one or more piping assemblies of the processing tank system, wherein the one or more piping assemblies provide a processing water supply assembly in fluid communication with a mixing assembly. The piping assemblies of the processing tank system may include an inlet flow piping assembly, a makeup flow piping assembly, a tank recirculation piping assembly and/or a process solution piping assembly. The mixing assembly can also be in fluid communication with other components of the poultry processing system, including a storage tank, mixing tank, processing tank, static mixer and/or heat exchanger.

In some aspects, the ancillary system can comprise one or more conventional metering pumps for supplying processing water to the mixing assembly from a source of the processing water.

In some aspects, the mixing assembly can comprise one or more mixers, one or more venturi injectors, or a combination thereof. In some aspects, the mixing assembly comprises one or more venturi injectors configured to utilize the flow of a processing water over an orifice to create suction that draws the antimicrobial agent, the alkaline agent, or both, to mix with the processing water to provide a chemical intervention processing solution. In some aspects, the processing solution from the one or more venturi injectors can be utilized as a chemical intervention processing solution in a processing tank application. In some aspects, the processing solution resulting from the one or more venturi injectors can be provided to a storage tank or mixing tank before being utilized in a processing tank application. In some aspects, the processing solution resulting from the one or more venturi injectors can be provided to an intermediate processing piping assembly prior to being used in a processing application. In some alternative aspects, the processing solution resulting from the one or more venturi injectors can be provided directly to a processing tank for a processing tank application.

In some aspects, the antimicrobial agent comprises one or more peroxycarboxylic acids. In some other aspects, the antimicrobial agent comprises peracetic acid. In some aspects, the antimicrobial agent is a concentrated solution. In some aspects, the antimicrobial agent is a concentrated solution of one or more peroxycarboxylic acids having a concentration between about 1000 ppm and about 375,000 ppm, in some aspects between about 10,000 ppm and about 350,000 ppm, in some aspects between about 50,000 ppm and about 350,000 ppm, in some aspects between about 100,000 ppm and about 350,000 ppm, in some aspects between about 150,000 ppm and about 350,000 ppm, in some other aspects between about 200,000 ppm and about 350,000 ppm, in some other aspects between about 240,000 ppm and about 350,000 ppm, in some aspect between about 1000 ppm and about 240,000 ppm, in some aspects between about 10,000 ppm and about 240,000 ppm, in some aspects between about 50,000 ppm and about 240,000 ppm, in some aspects between about 100,000 ppm and about 240,000 ppm, in some aspects between about 150,000 ppm and about 240,000 ppm, and in some other aspects between about 200,000 ppm and about 240,000 ppm. In some aspects, the concentrated solution of one or more peroxycarboxylic acids comprises peracetic acid.

In some aspects, the alkaline agent comprises sodium hydroxide, potassium hydroxide, or a mixture thereof.

In some aspects, a flow rate of the processing water is controlled by a control assembly that can adjust fluid flow through one or more flow meters, valves and/or pumps. In some aspects, the one or more flow meters, valves and/or pumps are in fluid communication with the mixing assembly. In some aspects, the one or more flow meters, valves and/or pumps are provided upstream of the mixing assembly. In some aspects, the one or more flow meters, valves and/or pumps are provided downstream of the mixing assembly.

In some aspects, the flow rate of the processing water proximate the mixing assembly is between about 25 gallons-per-minute (gpm) to about 400 gpm, in some aspects between about 40 gpm and about 350 gpm, and in some preferred aspects between about 50 gpm and about 300 gpm. In some aspects, a flow rate of the processing solution resulting from the mixing assembly is about the same as the flow rate of the processing water prior to the mixing assembly.

In some aspects, a flow rate of the antimicrobial agent flowing into the mixing assembly is controlled by the control assembly, which is capable of adjusting the flow of antimicrobial agent through one or more flow meters, valves and/or pumps. In some aspects, the one or more flow meters, valves and/or pumps are in fluid communication with the mixing assembly. In some aspects, the one or more flow meters, valves and/or pumps are provided between the source of antimicrobial agent and the mixing assembly.

In some aspects, a flow rate of the alkaline agent flowing into the mixing assembly is controlled by the control assembly, which is capable of adjusting the flow of alkaline agent through one or more flow meters, valves and/or pumps. In some aspects, the one or more flow meters, valves and/or pumps are in fluid communication with the mixing assembly. In some aspects, the one or more flow meters, valves and/or pumps are provided between the source of alkaline agent and the mixing assembly.

In some aspects, the one or more flow meters or pumps controlling the flow of each of the processing water, antimicrobial agent and/or alkaline agent, may be controlled by a control assembly in electrical communication with each of the one or more flow meters, valves and/or pumps.

In some aspects, the concentration of the antimicrobial in the processing water is known, such that the control assembly provides an electrical signal to the one or more flow meters or pumps of the processing water and/or antimicrobial agent to provide a desired concentration of the antimicrobial in the resulting processing solution. In some aspects, the antimicrobial concentration in the processing water is measured or determined by a monitoring system comprising one or more sensors or probes, wherein the flow of the antimicrobial agent through the one or more flow meters, valves and/or pumps is driven by a signal from the senor or probe to the control assembly. In some aspects, the signal from the sensor or probe is provided to the control assembly that controls the flow of the antimicrobial agent through the one or more flow meters or pumps to provide a desired concentration of the antimicrobial in the resulting chemical intervention processing solution. In some alternative aspects, the antimicrobial concentration in the processing water is known from prior measurement or titration of the processing water, such that the use of a sensor or probe to monitor the antimicrobial concentration in the processing water is unnecessary. Instead, the flow of the antimicrobial agent through the one or more flow meters, valves and/or pumps is calculated based upon the flow rate of the processing water provided directly to the mixing assembly or the flow rate of fresh make-up water to an intermediate tank that has a recirculation loop with some chemical intervention solution contained therein, such that the control assembly maintains an input flow rate of the antimicrobial agent provided to the mixing assembly.

In some aspects, the pH of the processing water is known, such that the control assembly provides an electrical signal to the one or more flow meters, valves and/or pumps of the processing water and/or antimicrobial agent to provide a desired concentration of the antimicrobial in the resulting chemical intervention processing solution. In some aspects, the pH of the processing water is measured or determined by the monitoring assembly, wherein the flow of the alkaline agent through the one or more flow meters, valves and/or pumps is driven by a signal from the monitoring assembly to the control assembly. In some aspects, the signal from the monitoring assembly is provided to the control assembly that controls the flow of the alkaline agent through the one or more flow meters or pumps to provide a desired pH in the resulting chemical intervention processing solution. In some alternative aspects, the pH of the processing water is known from prior measurement or titration of the processing water, such that the use of a sensor or probe to monitor the pH of the processing water is unnecessary. Instead, the flow of the alkaline agent through the one or more flow meters, valves and/or pumps is calculated based upon the flow rate of the processing water provided directly to the mixing assembly or the flow rate of fresh make-up water to an intermediate tank that has a recirculation loop with some chemical intervention solution contained therein, such that the control assembly maintains an input flow rate of the alkaline input provided to the mixing assembly.

In some aspects, the pH and the antimicrobial concentration in the processing water is known from prior measurement or titration of the processing water, such that the use of a sensor or probe to monitor either the pH or the antimicrobial concentration in the processing water is unnecessary. Instead, the flow of both the antimicrobial agent and alkaline agent through the one or more respective flow meters, valves and/or pumps is calculated based upon the flow rate of the processing water provided directly to the mixing assembly or the flow rate of fresh make-up water to an intermediate tank that has a recirculation loop with some chemical intervention solution contained therein, such that the control assembly maintains an input flow rate of the antimicrobial agent and the alkaline agent provided to the mixing assembly.

In some aspects, a source of the processing water is fresh water, recirculated processing solution, processing solution from another application, make-up water, stored processing solution, or a combination thereof.

In some aspects, the resulting chemical intervention processing solution from the mixing assembly comprises one or more peroxycarboxylic acids. In some aspects, the concentration of the one or more peroxycarboxylic acids in the resulting chemical intervention processing solution from the mixing assembly is between about 1 ppm and about 5000 ppm, in some aspects between about 5 ppm and about 2500 ppm, in some aspects between about 10 ppm and about 2000 ppm, in some aspects between about 25 ppm and about 1500 ppm, in some aspects between about 40 ppm and about 1250 ppm, and in some other aspects between about 50 ppm and about 1000 ppm. In some aspects, the resulting chemical intervention processing solution from the mixing assembly comprises peracetic acid.

In some aspects, the mixing assembly provides a chemical intervention processing solution having a pH greater than 6.5, in some aspects great than 7, in some aspects greater than about 7.5, in some aspects greater than about 8.0, in some aspects greater than about 8.5, and in some other aspects greater than about 9.0. In some aspects, the mixing assembly provides a processing solution having a pH up to about 13.5, in some aspects up to about 13.0, in some aspects up to about 12.5, in some aspects up to about 12.0, in some aspects up to about 11.5, in some aspects up to about 11.0, in some aspects up to about 10.5, in some aspects up to about 10.0, and in some aspects up to about 9.5. In some aspects, the mixing assembly provides a processing solution having a pH greater than 6.5 and up to about 13.5, in some aspects greater than 7.0 and up to about 13.0, in some aspects between about 7.5 and about 12.5, in some aspects between about 7.5 and about 12.0, in some aspects between about 7.5 and 11.5, in some aspects between about 7.5 and about 11.0, in some aspects between about 7.5 and about 10.0, and in some other aspects between about 7.2 and about 8.6.

In some aspects, the mixing assembly provides a chemical intervention processing solution having the desired antimicrobial concentration, but the pH is below about 6.5 and in some aspects below about 7.0. In some aspects, it is desirable for the chemical intervention processing solution to have a pH greater than 7, in some aspects greater than about 7.5, in some aspects greater than about 8.0, in some aspects greater than about 8.5, and in some other aspects greater than about 9.0. In some aspects, it is desired for the chemical intervention processing solution to have a pH up to about 13.5, in some aspects up to about 13.0, in some aspects up to about 12.5, in some aspects up to about 12.0, in some aspects up to about 11.5, in some aspects up to about 11.0, in some aspects up to about 10.5, in some aspects up to about 10.0, and in some aspects up to about 9.5. In some aspects, it is desirable to have a chemical intervention processing solution having a pH greater than 6.5 and up to about 13.5, in some aspects greater than 7.0 and up to about 13.0, in some aspects greater than 7.0 and up to about 12.5, in some aspects been about 7.5 and about 12.0, in some aspects between about 7.5 and 11.5, in some aspects between about 7.5 and about 11.0, in some aspects between about 7.5 and about 10.0, and in some other aspects between about 7.2 and about 8.6.

In some aspects, the processing water supplied to the mixing assembly already has the desired pH, such that mixing assembly only provides the antimicrobial agent to the processing water to provide the chemical intervention processing solution having the desired antimicrobial concentration and desired pH.

In some aspects, the processing water supplied to the mixing assembly has a pH below the desired pH and the mixing assembly only provides the antimicrobial agent to the processing water to provide the chemical intervention processing solution having the desired antimicrobial concentration. In some aspects, the chemical intervention processing solution can be further pH adjusted. In some aspects, the chemical intervention processing solution is further pH adjusted to the desired pH after the chemical intervention processing solution leaves the mixing assembly where the antimicrobial agent is mixed with the processing water. In some aspects, the chemical intervention processing solution is pH adjusted prior to being provided to a storage tank. In some aspects, the chemical intervention processing solution is pH adjusted in a storage tank. In some aspects, the chemical intervention processing solution is stored in a storage tank prior to being pH adjusted. In some aspects, the chemical intervention processing solution is pH adjusted prior to being used in a processing application. In some aspects, a second mixing assembly is used to adjust the pH of the processing solution after the processing solution having the desired antimicrobial concentration has been stored in a storage tank.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 4 is a schematic illustration of a poultry carcass water chiller tank red water loop system according to a representative embodiment of the present invention.

Figure 1:
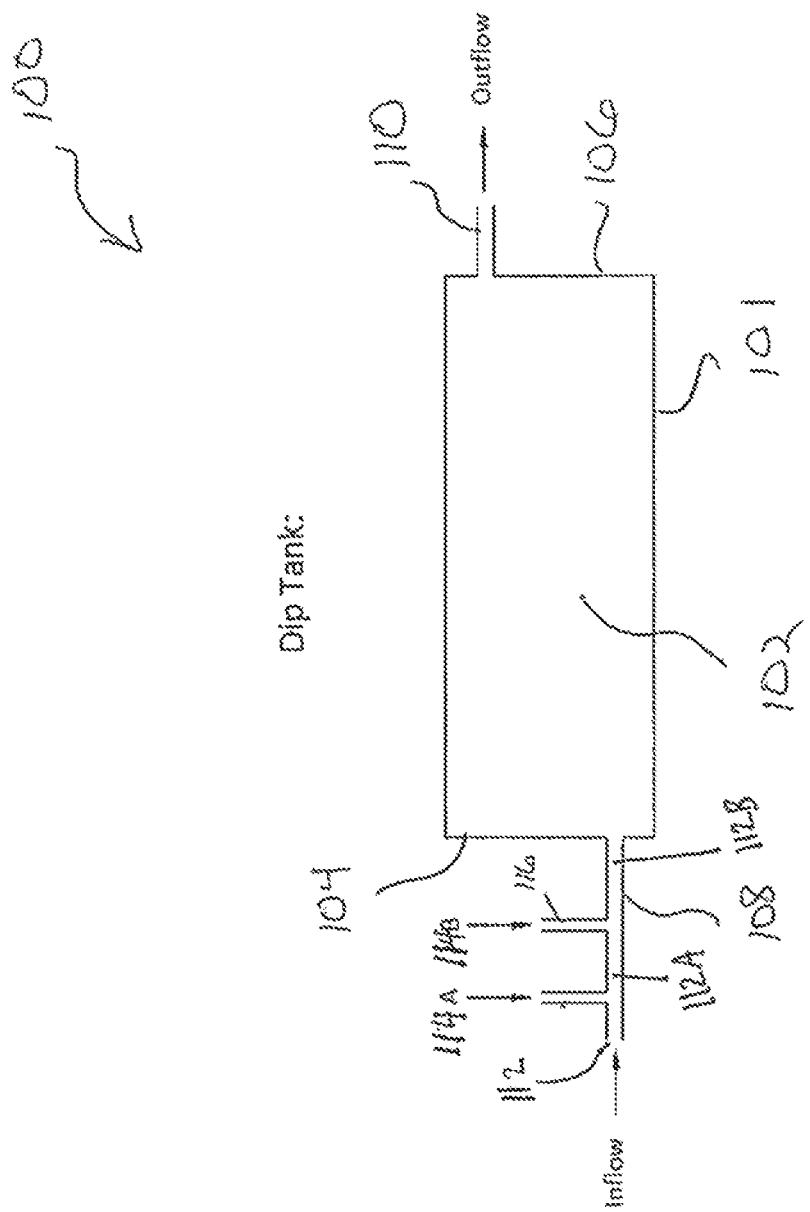
FIG. 1 is a schematic illustration of a poultry carcass dip tank according to a representative embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Representative embodiments of the present invention provide methods and systems for improving the efficacy of antimicrobial agents in processing tanks by eliminating large concentration gradients across the length of the processing tank. In some embodiments, the invention can include consistently exposing poultry carcasses to a process solution having a similar concentration prior to introduction into a first end of a processing tank and upon exiting a second end of a processing tank. While the processing solution of the present invention is discussed in reference to a peroxycarboxylic acid, such as PAA, one of ordinary skill in the art will appreciate that the present invention is applicable to one or more antimicrobial components used in processing poultry.

In some embodiments, the invention can include consistently exposing poultry carcasses to process solution having similar pH prior to introduction into a first end of a processing tank and upon exiting a second end of a processing tank. Representative embodiments of the present invention utilize one or more ancillary systems for introducing a processing solution having at least one peroxycarboxylic acid in a processing water having a pH of about 7 to about 10 that is thoroughly mixed prior to introduction into the processing tank, such that the processing tank will not experience zones having different pH levels. In some embodiments, the ancillary system can comprise a piping inlet or piping recirculation loop in which the peroxycarboxylic acid is added to a processing water having a desired pH and thoroughly mixed prior to its introduction to the processing tank. In some embodiments, the ancillary system can comprise a storage tank or similar style reservoir into which the peroxycarboxylic acid is added to the processing water having a desired pH and mixed prior to its introduction to the processing tank. In some aspects, a pH adjustment component may need to be added to either the processing water or processing solution in the ancillary system to obtain the desired pH of the processing solution. Regardless of the design, the ancillary system will have high velocities and corresponding high Reynolds numbers such that the processing water, peroxycarboxylic acid, and any pH adjustment product is adequately mixed providing a processing solution having a desired pH and concentration of the peroxycarboxylic acid, such as PAA, prior to introduction into the processing tank. The present invention can further include measuring the pH within the ancillary system to accurately determine pH prior to introduction into the processing tank and without concern for fouling of a pH probe that is a common occurrence due to organic material from carcasses within the processing tank itself.

In a first embodiment as illustrated in FIG. 1, a poultry processing system 100 of the present invention can comprise a process tank 101 such as, for example, a dip tank including a processing solution 102. The processing solution 102 generally comprises a processing water containing a peroxycarboxylic acid, preferably PAA, wherein the processing water was provided at a desired pH that is advantageous for processing and rinsing poultry carcasses and mixed with the peroxycarboxylic acid prior to being provided in the process tank 101. The process tank 101 generally comprises a first end 104 and a second end 106, wherein an inflow pipe 108 introduces the processing solution 102 into the process tank 101 and an outflow pipe 110 removes the processing solution 102 from the process tank 101.

As illustrated in FIG. 1, the inflow pipe 108 can comprise an ancillary water inflow portion 112, and one or more ancillary systems 114a and 114b can be used to supply a pH adjustment product and intervention chemistry, such as peroxycarboxylic acid, preferably PAA, to the inflow pipe 108 prior to the processing solution being introduced into the process tank 101. For example, the inflow pipe 108 can comprise a water supply 112 into which the pH adjustment product is directly added by ancillary system 114a, to the extent necessary, to provide a processing water. The processing water having the desired pH can then have the intervention chemistry, such as peroxycarboxylic acid, preferably PAA, added by ancillary system 114b. For example, the pH of the water inflow supply 1122 can be measured such that the pH adjustment product can be added to the water supply 112 through the use of a conventional metering pump or through a venturi injector or the like to obtain the desired pH of the processing water, preferably between about 7 and about 10. Generally, the flow of the water supply 112 with respect to ancillary system 114a should have a high enough velocity and correspondingly, Reynolds number to thoroughly mix the pH adjustment product into the water supply 112 to provide a processing water 112a having the desired pH before it is introduced into the inflow pipe 108. The pH of the supply water 112 and/or the processing water 112a can be determined in the inflow pipe 108 prior to the introduction of any intervention chemistry, such as peroxycarboxylic acid. Similarly, the flow of the processing water 112a having the desired pH with respect to ancillary system 114b should have a high enough velocity and correspondingly, Reynolds number to thoroughly mix the intervention chemistry, such as peroxycarboxylic acid, preferably PAA, into the processing water 112a to provide a processing solution 112b before it is introduced into the inflow pipe 108. The pH of the processing solution 112b can be measured in the inflow pipe 108 prior to the introduction of the processing solution 112b into the processing tank 101 to confirm the desired pH of the processing solution 112b. Alternatively, the pH of the processing water 112a and the processing solution 112b can both be measured in the inflow pipe 108.

Alternatively, ancillary system 114a can comprise a mixing tank or similar reservoir into which the pH adjustment product is added to a water supply and thoroughly mixed before being introduced into the inflow pipe 108. Similarly, ancillary system 114b can comprise a tank or similar reservoir of the intervention chemistry. In this way, the pH of the processing water 112a is precisely controlled and maintained as the inflow pipe 108 delivers the processing solution 112b into the first end 104 of the process tank 100. Since the processing solution 112b contains the processing water 112a at a desired pH thoroughly mixed with the intervention chemistry, the pH of the processing solution 112b will be consistent prior to introduction into the processing tank 101. As such, pH will remain consistent throughout the process tank 101 and there will not be localized areas of higher or lower pH within the process tank 101 as a result of mixing the components within the process tank 101 that would limit the effectiveness of the processing solution in rinsing, chilling or otherwise treating the poultry carcasses. Furthermore, pH can be monitored in either the inflow pipe 108 or the ancillary systems 112a, 112b such that a pH probe/sensor is not exposed to potential fouling within the process tank 101.

Figure 2:
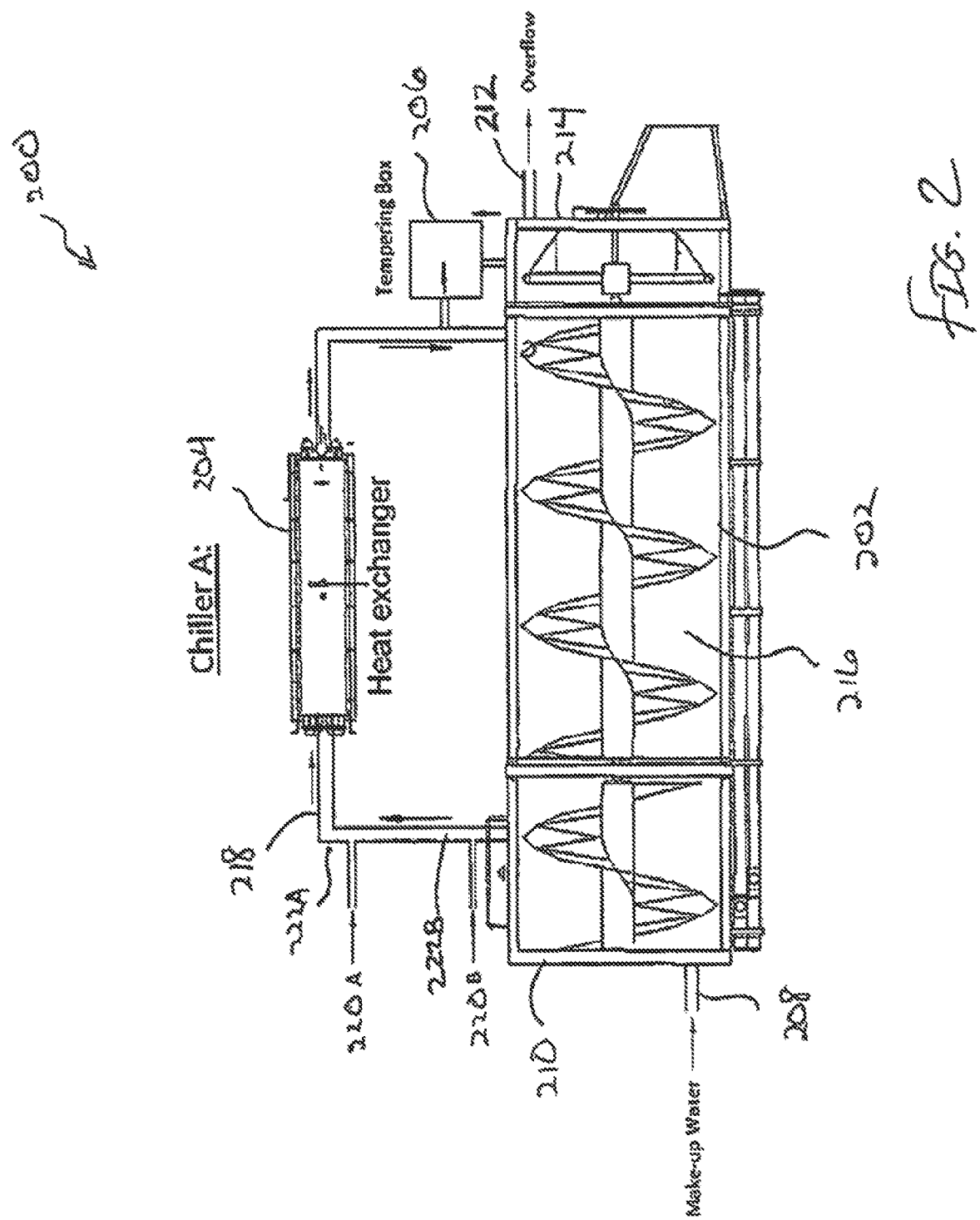
FIG. 2 is a schematic illustration of a poultry carcass water chiller tank with red water loop system according to a representative embodiment of the present invention.
Figure 3:
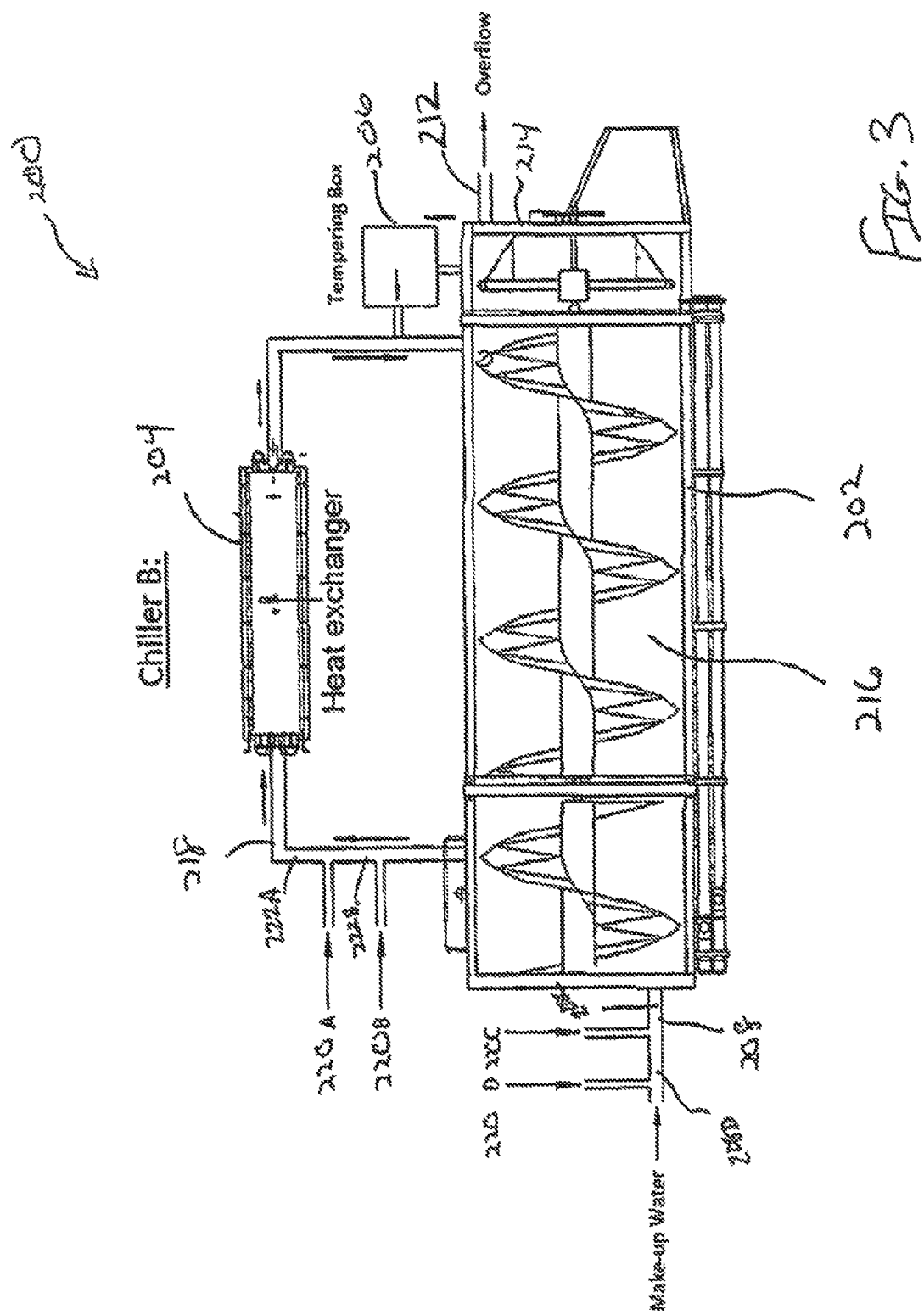
FIG. 3 is a schematic illustration of a poultry carcass water chiller tank red water loop system according to a representative embodiment of the present invention.

With reference to FIGS. 2, 3 and 4, various embodiments of a chiller tank with red water loop processing system 200 are illustrated. As will be described, the water chiller tank with red water loop processing system 200 can comprise varying levels of complexity based upon specific processing conditions, and as such, a variety of methods and system designs can be implemented to control pH within the water chiller tank with red water loop processing system.

In all of the illustrated embodiments, the chiller tank with red water loop processing system 200 comprises chiller tank 202, a heat exchanger 204 and an optional tempering box 206. In each of the embodiments, a make-up water stream 208 is supplied to a first end 210 of the chiller tank 202 while an overflow stream 212 is removed at a second end 214 of the chiller tank 202. In order to maintain temperature of a pH adjusted processing solution 216 within the chiller tank 202, a red water recirculation loop 218 supplies pH adjusted processing solution 216 from the chiller tank 202 to the heat exchanger 204, wherein the temperature of the pH adjusted processing solution is modified to the desired temperature and subsequently returned to the chiller tank 202.

With reference to FIG. 2, one or more ancillary systems 220a, 220b can supply the intervention chemistry and pH adjustment product and into the recirculation loop 218, wherein the processing solution 216 is thoroughly mixed and at the desired pH and temperature prior to introduction into the chiller tank 202. For example, ancillary system 220b can comprise a processing water supply having a pH adjustment product or the pH adjustment product that is directly added to the recirculated processing solution 216 in the red water recirculation loop 218. For example, the pH adjustment product can be added to the recirculated processing water through the use of a conventional metering pump or through a venturi injector or the like. Generally, the flow of the recirculated processing water in ancillary red water recirculation loop 218 should have a high enough velocity and correspondingly, Reynolds number to thoroughly mix the pH adjustment product into the recirculated processing water before it is introduced into the heat exchanger and chiller tank 202. Alternatively, ancillary system 220b can comprise a mixing tank or similar reservoir into which the pH adjustment product is added and thoroughly mixed with a water supply to provide a processing water supply 220b before being introduced into the red water recirculation loop 218. In this way, the pH is precisely controlled and maintained as the red water recirculation loop 218 delivers the pH adjusted processing solution 216 into the chiller tank 202. Similarly, the flow of the recirculated processing water 222b having the desired pH with respect to ancillary system 220b should have a high enough velocity and correspondingly, Reynolds number to thoroughly mix the intervention chemistry, such as peroxycarboxylic acid, preferably PAA, into the recirculated processing water 222b to provide a refreshed processing solution 222a having a desired concentration before it is introduced back into the chiller tank 202. The pH of the processing solution 222b can be measured in the inflow pipe 218 prior to the introduction of the processing solution 222a into the chiller tank 202 to confirm the desired pH of the processing solution 222a. Alternatively, the pH of the recirculated processing water 222b and the processing solution 222b can both be measured in the inflow pipe 218.

In a variation to the embodiment shown in FIG. 2, the chiller tank with red water loop processing system 200 of FIG. 3 can comprise additional ancillary systems 220c, 220d that supply the intervention chemistry and pH adjustment product, respectively, into the make-up water stream 208, such that the processing solution 216 is added at the first end 210 of the chiller tank 202 in a manner similar to that as previously described with respect to the processing solution 112b of the poultry processing system 100. In this manner, the processing solution 208c having the desired pH and intervention chemistry concentration is added to the chiller tank 202 at the first end 210 to provide a processing solution 216 within the chiller tank 202.

In the embodiment illustrated in FIG. 4, the chiller tank with red water loop processing system 200 can further comprise a bypass loop 230 that introduces additional residence time and consequently, mixing of the pH adjustment product before it is introduced into the chiller tank 202. As illustrated, the bypass loop 230 can fluidly interconnect the make-up water stream 208 with the recirculation loop 218. In this way, one or more ancillary systems 220a, 220b, 220c, 220d can be utilized to introduce the intervention chemistry (220a, 220c) and pH adjustment product (220b, 220d) at an advantageous location prior to its introduction into the chiller tank 202. For example, ancillary systems 220d can be utilized to supply the pH adjustment product directly into the water within the bypass loop 230, while ancillary system 220b can supply the pH adjustment product into the recirculation loop 218 at a point upstream of the connection to the bypass loop 230. In an embodiment, ancillary system 22c can add intervention chemistry to the processing water 222d to provide a processing solution 222c before being introduced into the recirculation loop 218. In yet another alternative embodiment, ancillary system 220a can add all or additional intervention chemistry to the recirculation loop 218 at a point downstream of the connection to the bypass loop 230 containing processing solution 222c and recirculated processing solution 222B. The location of the ancillary systems in the chiller tank processing system 200 can be advantageously selected to make use of high velocities and Reynolds numbers to thoroughly mix the pH adjustment product and/or intervention chemistries prior to its introduction and/or reintroduction into the chiller tank 202.

In all of the variations of the chiller tank with red water loop processing system 200 described herein, a pH sensor/probe can be positioned in locations remote from the chiller tank 202. For example, the make-up water stream 208, the recirculation loop 218 and/or the bypass loop 230 can contain pH sensor/probes that are not exposed to fouling and/or contamination that can result from exposure to poultry contaminants within the chiller tank 202. Further, the pH sensor/probes can be located after the pH adjustment product is added to provide the processing water and/or after the intervention chemistry to provide the processing solution. In this way of the pH sensor/probes maintained outside of the chiller tank, maintenance is eliminated or otherwise reduced and operators can have a higher level of confidence that pH of the processing solution and concentration of intervention chemistry is at the desired levels before being introduced into the chiller tank 202.

In each of the embodiments shown in FIGS. 1-4, the overflow 110, 210 can also have pH probe/sensors to precisely determine the pH of the processing solution 102, 216 after it exits the respective tank. By determining the pH of the processing solution after it exits the tank, the amount of active PAA can be determined as a result of the organic material in the tank, which may determine the pH level and amount of intervention chemistry in the inlet prior to being introduced into the tank.

In the embodiments shown in FIGS. 7A-7D, chemical intervention processing system 700 of the present invention generally comprises ancillary system 714 in fluid communication with a source of antimicrobial agent 710, a source of alkaline agent 712, and at least one source of processing water 721. Ancillary system 714 can provide chemical intervention processing solution 716 having a desired antimicrobial concentration and a desired pH. Processing solution 716 can be utilized in a food processing application 760, such as the processing solution in a chiller tank, dip tank, bulk tank, spray cabinet or sprayer for a food processing application, including soaking, dipping, quenching, rinsing, spraying, or washing food process applications. In some preferred aspects, the food processing application is for poultry. Chemical intervention processing solution 716 provided by ancillary system 714 can also be provided to an intermediate storage tank or intermediate processing piping assembly prior to being provided to one or more processing applications 760.

Figure 7A:
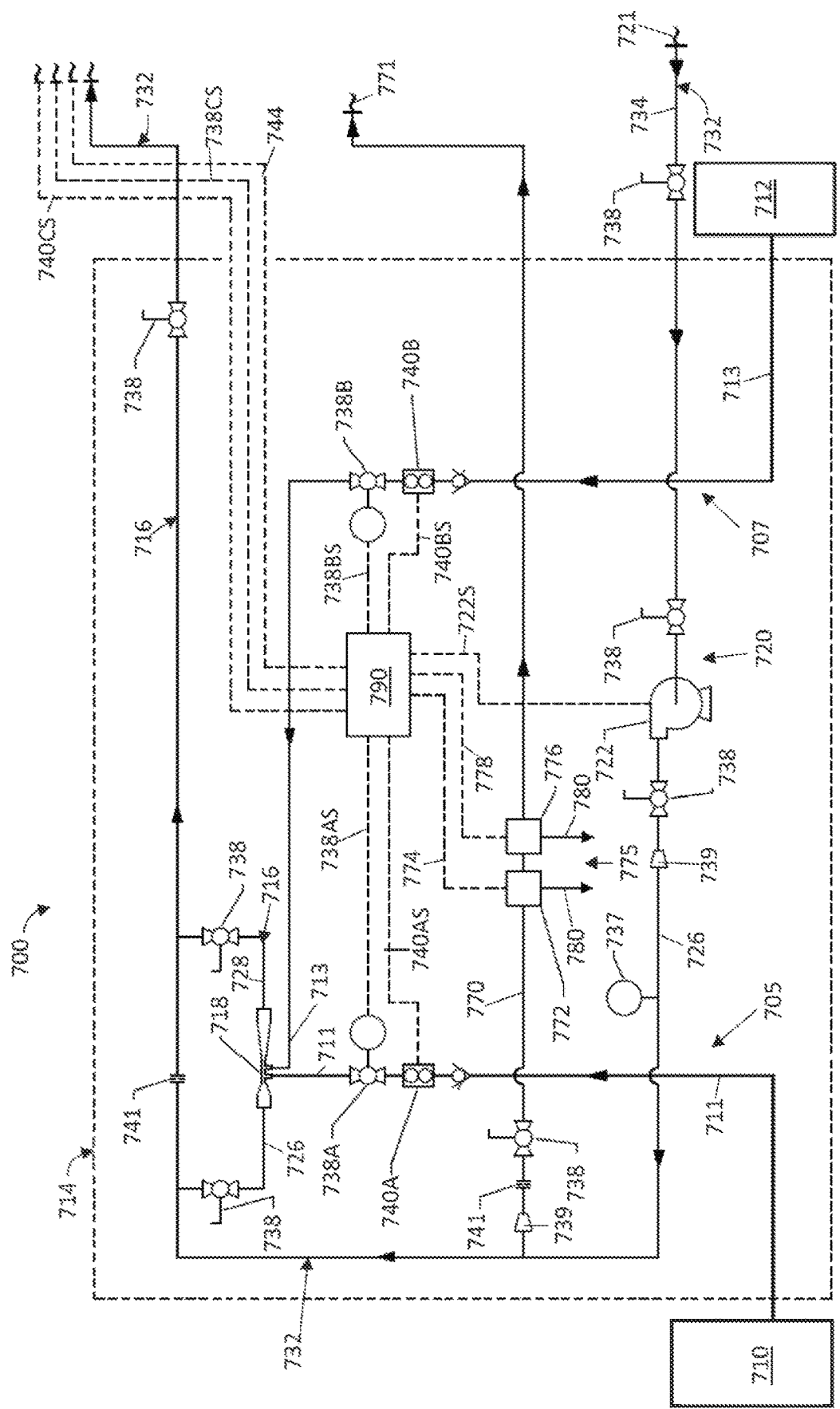
FIG. 7A is a schematic illustration of an ancillary assembly in fluid communication with a piping assembly of a processing tank system, the ancillary system having a monitoring system for determining both antimicrobial concentration and pH, according to certain embodiments of the present invention.
Figure 7B:
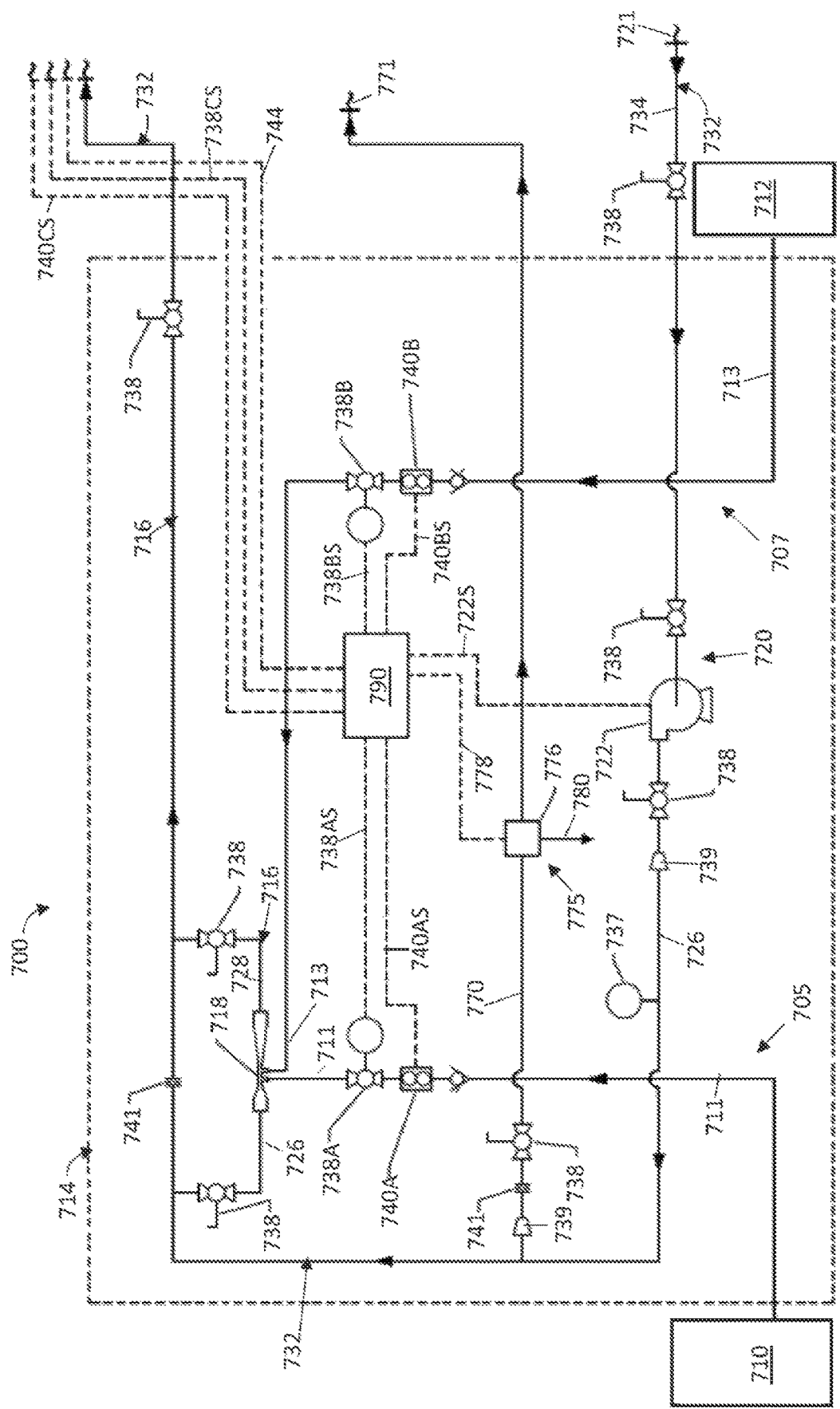
FIG. 7B is a schematic illustration of an ancillary assembly in fluid communication with a piping assembly of a processing tank system, the ancillary system having a monitoring system only for determining pH, according to certain embodiments of the present invention.
Figure 7C:
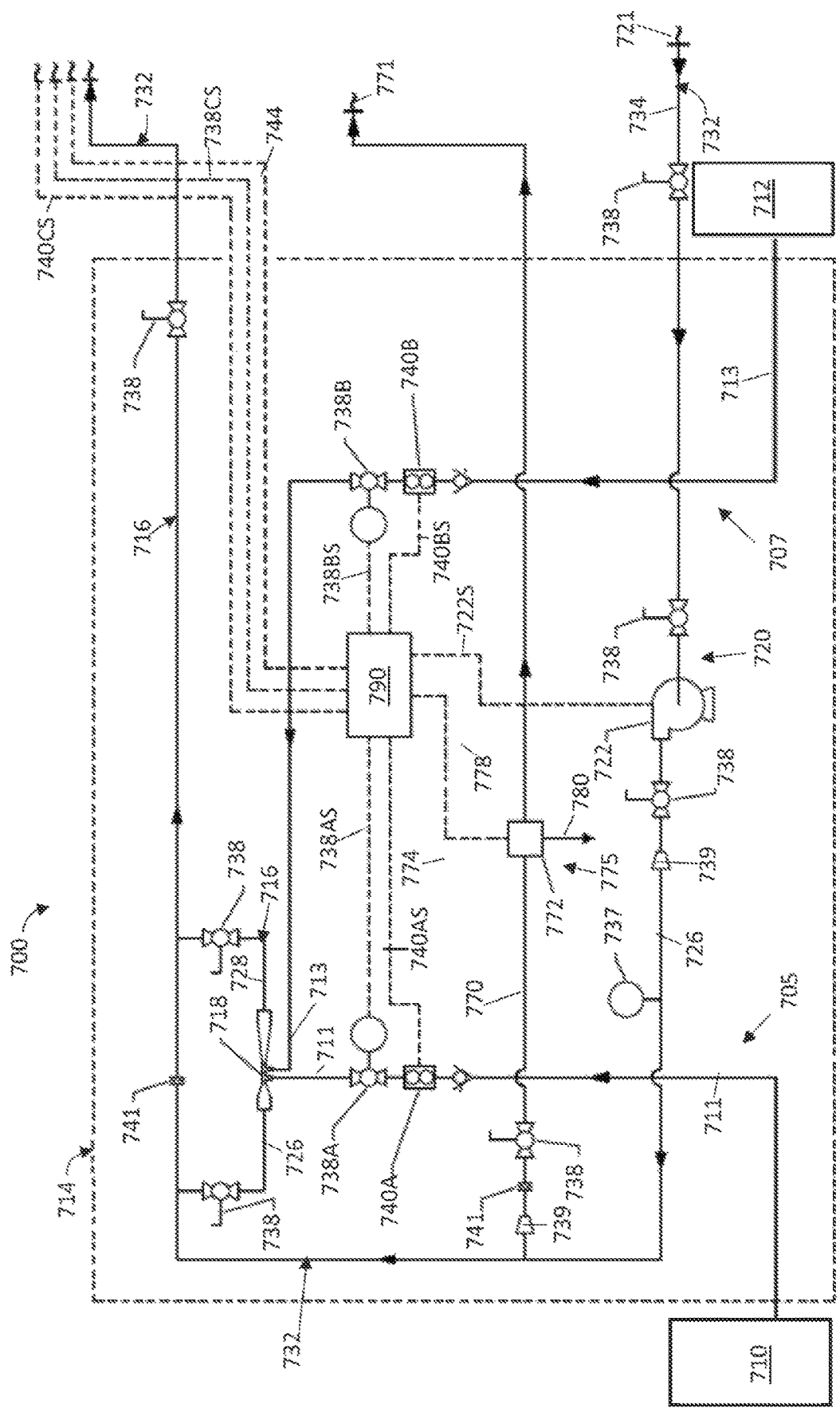
FIG. 7C is a schematic illustration of an ancillary assembly in fluid communication with a piping assembly of a processing tank system, the ancillary system having a monitoring system only for determining antimicrobial concentration, according to certain embodiments of the present invention.
Figure 7D:
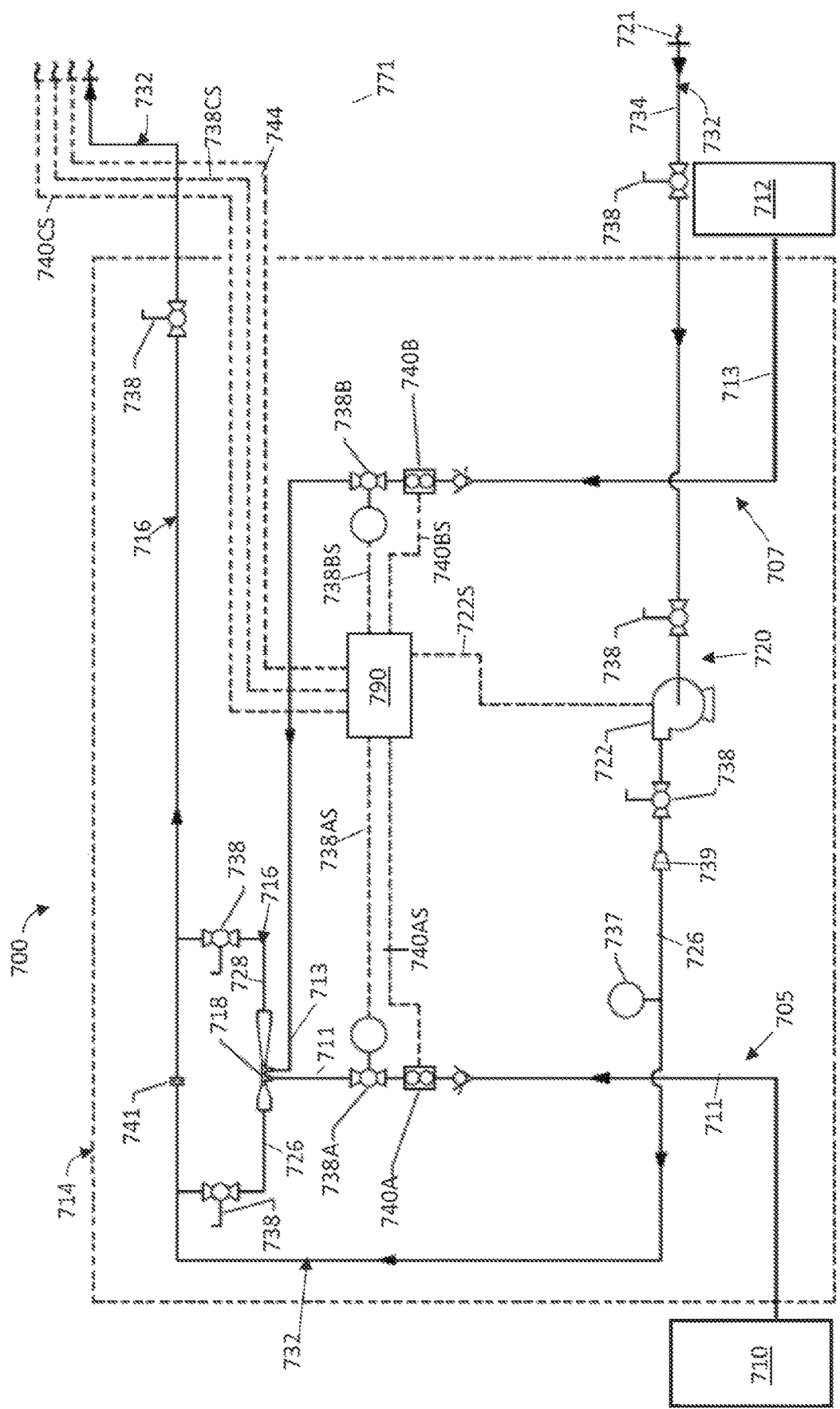
FIG. 7D is a schematic illustration of an ancillary assembly in fluid communication with a piping assembly of a processing tank system, the ancillary system not measuring antimicrobial concentration or pH, according to certain embodiments of the present invention.

Referring now to FIGS. 7A-7C, ancillary system 714 comprises mixing assembly 718 in fluid communication with a processing water supply assembly 720 generally comprising a processing water source 721, pump 722 and inlet line 726. Processing water supply assembly 720 can also comprise one or more valves 738, one or more pressure gauges 737, one or more check valves 739 and/or one or more flow orifices 741. In some aspects, such as shown in FIG. 7D, the processing water source 721 can be a tank 730 that is configured to contain a volume of processing water, which can be provided to ancillary system 714 via one or more piping assemblies, such as recirculation loop 732. In some other aspects, the processing water source 721 may be provided to ancillary system 714 via one or more piping assemblies from a fresh water source, reclaimed water source, reused water source, recycled water source, red water source, or a combination thereof.

Pump 722, which in some aspects may be a conventional metering pump, may be used to provide the processing water source 721 to inlet line 726 of mixing assembly 718. For example, pump 722 may be a recirculation pump in fluid communication with tank 730 and recirculation loop 732, such that pump 722 may be used to move the source of processing water from tank 730 to mixing assembly 718 via inlet line 726 of recirculation loop 732 to provide processing solution 716 that is then recirculated back to tank 730 via outlet line 728 of recirculation loop 732. Recirculation loop 732 can have outlet stream 734 from tank 730 that provides processing water to input line 726 of mixing assembly 718 to provide processing solution 716 to outlet line 728 of mixing assembly 718 that provides processing solution 716 to inlet stream 736 of tank 730. One or more valves 738 and/or one or more flow meters 740 may control the flow rate within recirculation loop 732.

Mixing assembly 718 can also be in fluid communication with antimicrobial dosing assembly 705 and/or alkaline dosing assembly 707.

Antimicrobial dosing assembly 705 generally comprises a source of antimicrobial agent 710, antimicrobial agent input line 711, and one or more valves 738 and/or one or more flow meters 740. In some aspects, the source of antimicrobial agent 710 can be a container or tank holding a concentrated antimicrobial solution. In some other aspects, the source of antimicrobial agent 710 can be generated on-site. In some other aspects, the source of antimicrobial agent 710 can be generated on-site at the point-of-use. Antimicrobial dosing assembly 705 can also comprise one or more pressure gauges 737 and/or one or more check valves 739.

Alkaline dosing assembly 707 generally comprises source of alkaline agent 712, alkaline agent input line 713 and one or more valves 738 and/or one or more flow meters 740. In some aspects, the source of alkaline agent 712 can be a container or tank holding a concentrated alkaline solution. In some other aspects, the source of alkaline agent 712 can be generated on-site. In some other aspects, the source of alkaline agent 712 can be generated on-site at the point-of-use. Alkaline dosing assembly 707 can also comprise one or more pressure gauges 737 and/or one or more check valves 739.

In some aspects, one or more valves 738 can be located between the source of antimicrobial agent 710 and mixing assembly 718. In some aspects, one or more valves 738 can be located between the source of alkaline agent 712 and mixing assembly 718. In some aspects, one or more flow meters 740 can be located between the source of antimicrobial agent 710 and mixing assembly 718. In some aspects, one or more flow meters 740 can be located between the source of alkaline agent 712 and mixing assembly 718.

In some aspects, there is at least one valve 738 and at least one flow meter 740A located between the source of antimicrobial agent 710 and mixing assembly 718 and at least one valve 738 and at least one flow meter 740B located between the source of alkaline agent 712 and mixing assembly 718. Valve 738 and flow meter 740A control the flow rate of the antimicrobial agent 710 to the mixing assembly 718. Valve 738 and flow meter 740B control the flow rate of the alkaline agent 712 to the mixing assembly 718. In some aspects, valve 738 is a modulating valve or ball valve. The one or more valves 738 may also be used to stop the flow, or redirect the flow, at one or more sections within ancillary system 714. For instance, as shown in FIGS. 7A-7C, valves 738 proximate mixing assembly 718 may be closed to direct the flow of the processing water only through flow orifice 741 of recirculation loop 732.

In some preferred aspects, mixing assembly 718 is one or more venturi injectors configured to utilize the flow of processing water from inlet line 726 over at least one orifice to create suction that draws the source of antimicrobial agent 710 via antimicrobial agent input line 711, the source of alkaline agent 712 via alkaline agent input line 713, or both, and mix the source of processing water 721, the source of antimicrobial agent 710 and/or the source of alkaline agent 712, proximate the input mixing assembly 718, to provide a resulting chemical intervention processing solution 716 proximate outlet line 728.

In some aspects, as shown in FIGS. 7A-7C, mixing assembly 718 comprises a single venturi injector configured to utilize the processing water flow from inlet line 726 over at least one orifice to create suction that draws the source of antimicrobial agent 710 via antimicrobial agent input line 711 and the source of alkaline agent 712 via alkaline agent input line 713 to provide the resulting chemical intervention processing solution 716 having both the desired antimicrobial concentration and the desired pH.

In some aspects, mixing assembly 718 comprises a single venturi injector configured to utilize the processing water flow from inlet line 726 over at least one orifice to create suction that draws only the source of antimicrobial agent 710 via antimicrobial agent input line 711 to provide the resulting processing solution 716 having the desired antimicrobial concentration. In some aspects, the pH of the processing water from inlet line 726 already has the desired pH, such that addition of the source of alkaline agent 712 is not necessary proximate mixing assembly 718. For instance, the pH of the processing water may already been adjusted to the desired pH at the source of processing water or prior to mixing assembly 718. In some alternative aspects, the resulting processing solution 716 does not have the desired pH upon exit of mixing assembly 718 proximate outlet line 728, such that the pH of the processing solution 716 is adjusted after leaving mixing assembly 718.

In some aspects, mixing assembly 718 comprises a single venturi injector configured to utilize the processing water flow from inlet line 726 over at least one orifice to create suction that draws only the source of alkaline agent 712 via alkaline agent input line 713 to provide processing water having the desired pH. In some aspects, the processing water from inlet line 726 already has the desired antimicrobial concentration, such that addition of the source of antimicrobial agent 710 is not necessary proximate mixing assembly 718. For instance, the desired antimicrobial concentration may already been provided at the source of processing water or prior to mixing assembly 718. In some alternative aspects, the resulting processing solution 716 does not have the desired antimicrobial concentration upon exit of mixing assembly 718 proximate outlet line 728, such that the antimicrobial concentration of the processing solution 716 is adjusted after leaving mixing assembly 718.

In some aspects, the source of antimicrobial agent 710 and the source of alkaline agent 712 are drawn in sequential order within mixing assembly 718 to provide the processing solution 730 having both the desired antimicrobial concentration and the desired pH. In some aspects, the source of antimicrobial agent 710 is drawn into mixing assembly 718 prior to the source of alkaline agent 712. In some other aspects, the source of alkaline agent 712 is drawn into mixing assembly 718 prior to the source of antimicrobial agent 710. In some aspects, the source of antimicrobial agent 710 and the source of alkaline agent 712 are drawn in sequential order by two separate venturi injectors. One venturi injector may draw the source of antimicrobial agent 710 and the second venturi injector may draw the source of alkaline agent 712. In some aspects, the venturi injector drawing the source of antimicrobial agent 710 may be provided to processing water first followed by the source of alkaline agent 712 being drawn by the second venturi injector to provide the chemical intervention processing solution 716. In some other aspects, the venturi injector drawing the source of alkaline agent 712 may be provided to processing water first and then the source of antimicrobial agent 710 may be drawn by the second venturi injector to provide the chemical intervention processing solution 716.

In some aspects, mixing assembly 718 comprises a single venturi injector in fluid communication with antimicrobial agent input line 711 and alkaline agent input line 713. In some aspects, the fluid streams within input lines 711, 713 form a "Y-type" input, such that the single venturi injector is configured to utilize the flow of processing water from inlet line 726 over at least one orifice to create suction that draws simultaneously both the source of antimicrobial agent 710 via antimicrobial agent input line 711 and the source of alkaline agent 712 via alkaline agent input line 713 to provide the processing solution 716 having both the desired concentration of the antimicrobial and the desired pH. Processing solution 716 then flows from mixing assembly 718 via outlet line 728.

In some alternative aspects, mixing assembly 718 may comprise one or more mixers, such as a static mixer, to provide the processing solution 716. The one or more mixers may mix the source of processing water 721 provided from inlet line 726 with the source of antimicrobial agent 710 provided by antimicrobial agent input line 711 and/or the source of the alkaline agent 712 provided by alkaline agent input line 713. The source of antimicrobial agent 710 and/or the source of the alkaline agent 712 can be provided to the one or more mixers via one or more conventional metering pumps. The processing water provided from input 726 may be mixed with the source of antimicrobial agent 710 and the source of the alkaline agent 712 in sequential order or simultaneously. In some aspects, the source of antimicrobial agent 710 is mixed with the processing water from input 726 to provide the desired antimicrobial concentration prior to the source of alkaline agent 712 being introduced. In some aspects, the source of alkaline agent 712 is mixed with the processing water from input 726 to provide the desired pH prior to the source of antimicrobial agent 710 being introduced. In some aspects, the source of antimicrobial agent 710 and the source of alkaline agent 712 is mixed with the processing water from inlet line 726 simultaneously to provide processing solution 716 having the desired antimicrobial concentration and the desired pH. Processing solution 716 then flows from mixing assembly 718 via outlet line 728.

After the mixing assembly 718 provides the chemical intervention processing solution 716 having at least the desired antimicrobial concentration, in some preferred aspects both the desired antimicrobial concentration and the desired pH, the processing solution 716 can be provided to another part of chemical intervention processing system 700. In some aspects, the chemical intervention processing solution 716 can be utilized in one or more poultry processing applications, such as the processing solution 716 in a chiller tank, dip tank, spray cabinet or sprayer for a poultry processing application, including soaking, dipping, quenching, rinsing, spraying, or washing poultry process applications. In some other aspects, the chemical invention processing solution 716 can be provided for one or more other food product processing applications, including soaking, dipping, quenching, rinsing, spraying, or washing food product process applications.

In some aspects, chemical intervention processing solution 716 may be diluted prior to being used in an application to a desired processing concentration. Processing solution 716 may also be provided to one or more intermediate processing piping assemblies prior to being provided to the one or more food processing applications 760. Processing solution 716 may also be provided to one or more intermediate storage tanks prior to being utilized in one or more food processing applications 760.

In some other aspects, the chemical intervention processing solution 716 is provided to a Clean-In-Place system, such that the chemical intervention processing solution 716 is used to clean the interior surfaces of one or more food and beverage process pipe assemblies, processing vessels, tanks, spiral freezers, mixers, blenders, homogenizers, roasters and/or associated fittings.

Figure 7E:
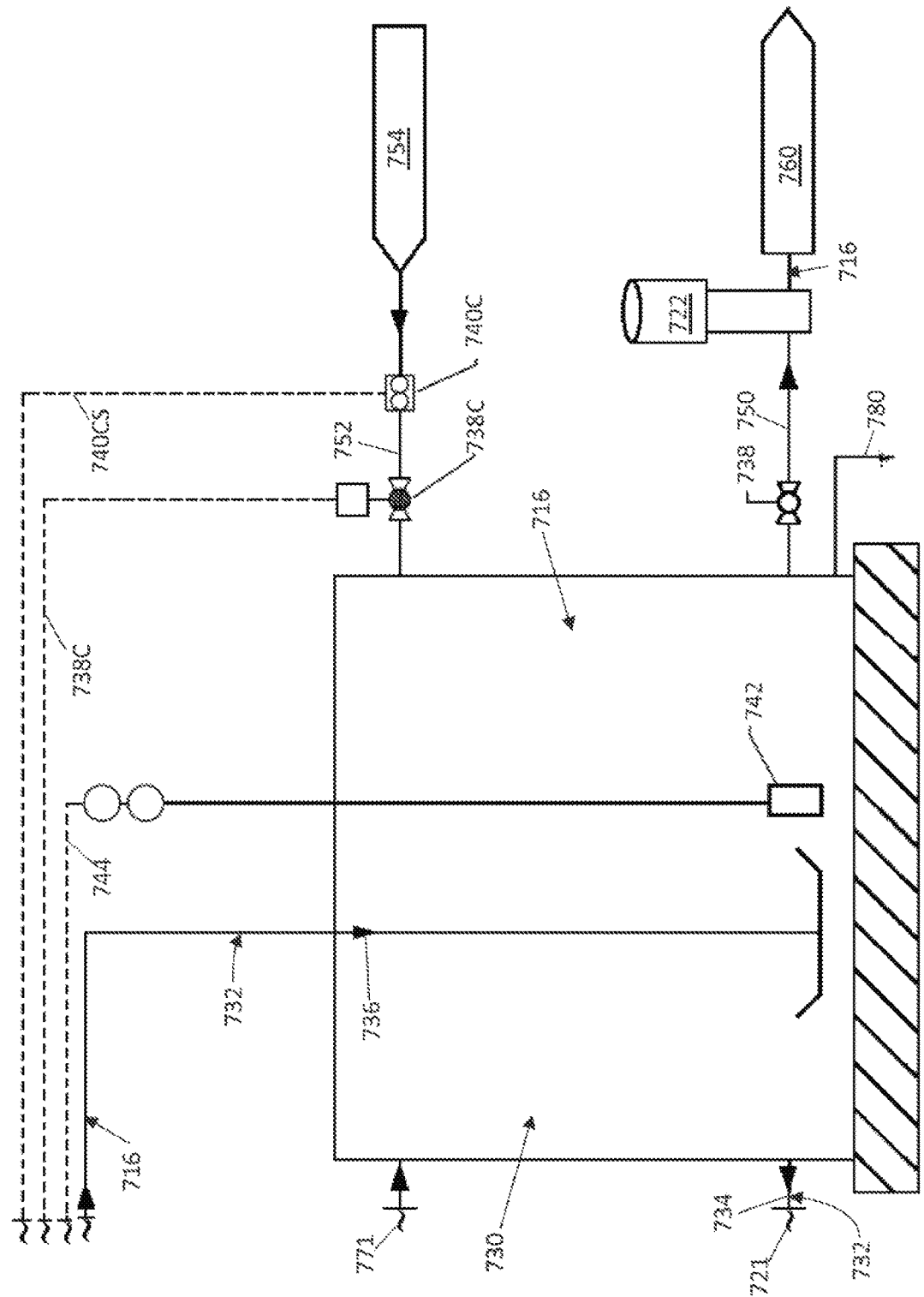
FIG. 7E is a schematic illustration of certain components of the processing tank system that may utilized with the ancillary assembly of any of FIGS. 7A-7B, according to certain embodiments of the present invention.

Referring now to FIG. 7E in relation to any of FIGS. 7A-7D, chemical intervention processing solution 716 from ancillary system 714 can be provided to tank 730, shown in FIG. 7E, which can be an intermediate storage tank. In some aspects, processing solution 716 is introduced into the bottom of tank 730, such that the flow of processing solution 716 into the tank 730 can mix the contents of tank 730 with processing solution 716. Tank 730 may contain level sensor 742, such as a pressure inducer, to indicate the volume of processing solution 716 in tank 730. As shown in FIG. 7E, downstream outlet line 750 can provide processing solution 716 from tank 730 to one or more poultry processing applications 760. In some aspects, downstream outlet line 750 provides processing solution 716 from tank 730 to a chill tank, dip tank, spray cabinet, sprayer, or combination thereof, for food product processing, such as poultry processing.

In some alternative aspects, downstream outline 750 can provide processing solution 716 to one or more intermediate process piping assemblies or a Clean-In-Place system.

In some aspects, chemical intervention processing solution 716 having a desired antimicrobial concentration and/or pH may be diluted after leaving tank 730 and prior to the one or more desired food processing applications 760, such as one or more poultry processing applications, to provide a chemical intervention processing solution having a desired antimicrobial processing concentration. One or more valves 738 may control the flow rate of processing solution 716 within downstream outlet line 750. In some aspects, one or more flow meters 740 may control the flow rate of processing solution 716 within downstream outlet line 750.

Tank 730 can have a make-up water inlet line 752 to provide processing water from a source of make-up water 754 into tank 730. Tank 730 may also have drain 780. At initial fill, tank 730 may be filled with processing water by make-up water inlet line 752. Make-up water inlet line 752 also provides processing water to tank 730 as processing solution 716 leaves tank 730 via downstream outlet line 750 and/or processing water provided to ancillary system 714. In some preferred aspects, the flow rate of processing water introduced into tank 730 via make-up water inlet line 752 is approximately the same flow rate of processing solution 716 leaving tank 730 via downstream outline line 750 and/or processing water provided to ancillary system 714. One or more valves 738 may control the flow rate of processing water provided into tank 730 within make-up water inlet line 752. In some aspects, one or more flow meters 740 may control the flow rate of processing water provided into tank 730 within make-up water inlet line 752. The source of make-up water 754 may be provided to tank 730 via one or more piping assemblies from a fresh water source, reclaimed water source, reused water source, recycled water source, red water source, or a combination thereof.

In some aspects, such as at initial setup, processing water contained within tank 730 may contain fresh water, make-up water, reused water, recycled water, reclaimed water, red water, or a combination thereof, such that at least the antimicrobial concentration is not initially provided at the desired level, and in some aspects at least the antimicrobial concentration and pH not initially provided at the desired levels. In some aspects, processing water contained within tank 730 may already have the desired pH level. Ancillary system 714 may be used via the recirculation loop 732 to the mixing assembly 714 and back to tank 730 to provide the contents within tank 730 to be a chemical intervention processing solution 716 having both the desired concentration and pH.

Based upon the volume of processing water in tank 730, an initial pH of processing water in tank 730, an initial antimicrobial concentration of processing water in tank 730, and the flow rate of make-up water line 752 to tank 730, the amount of antimicrobial agent and/or alkaline agent added to the processing water at mixing assembly 718 to achieve the resulting chemical intervention processing solution 716 having the desired antimicrobial concentration and/or pH can be calculated. Based upon such a calculation, the flow rate of the antimicrobial agent from the source of antimicrobial agent 710 to mixing assembly 714 can be adjusted and controlled by flow meter 740A and/or valve 738A to provide the desired antimicrobial concentration in chemical intervention processing solution 716. The flow rate of the alkaline agent from the source of alkaline agent 712 to mixing assembly 714 can be adjusted and controlled by flow meter 740B and/or valve 738B to provide the desired pH in chemical intervention processing solution 716. Preferably, the flow rate of the antimicrobial agent from the source of antimicrobial agent 710 to mixing assembly 714 is maintained at a constant flow rate by flow meter 740A and/or valve 738A and only adjusted upon new input of data. The flow rate of the alkaline agent from the source of alkaline agent 712 to mixing assembly 714 is also preferably maintained at a constant flow rate and only adjusted upon new input of data. In some aspects, control assembly 790 is in electrical communication with flow meter 740A and/or valve 738A to provide the appropriate flow rate of the antimicrobial agent from the source of antimicrobial agent 710 to mixing assembly 714. In some aspects, control assembly 790 is in electrical communication with flow meter 740B and/or valve 738V to provide the appropriate flow rate of the alkaline agent from the source of alkaline agent 712 to mixing assembly 714. In certain aspects, such as shown in FIG. 7D, the chemical intervention processing solution 716 having the desired antimicrobial concentration and/or desired pH can be provided by mixing assembly 714 based upon calculation alone without monitoring the antimicrobial concentration and/or pH of the processing water and/or the resulting chemical intervention processing solution 716.

Tank 730 can have a volume capacity between about 20 and about 100,000 gallons, in some aspects between about 100 and about 75,000 gallons, in some aspects between about 150 and about 50,000 gallons, and in some other aspects between about 200 and about 10,000 gallons. In addition to the amount of antimicrobial agent and/or alkaline agent added to the processing water at mixing assembly 718 to achieve the processing solution 716 having the desired antimicrobial concentration and/or pH being able to be calculated, the amount of time to circulate processing water from tank 730 to mixing assembly 718 and back to tank 730 to achieve the processing solution 716 having the desired antimicrobial concentration and/or pH may also be calculated.

In some other aspects where tank 730 is not provided as the source of processing water, the amount of antimicrobial agent and/or alkaline agent added to the processing water at mixing assembly 718 to achieve the resulting chemical intervention processing solution 716 having the desired antimicrobial concentration and/or pH can still be calculated based upon the flow rate of processing water into mixing assembly 718. In some aspects, an initial antimicrobial concentration of processing water and/or an initial pH of processing water into mixing assembly 718 may also be considered in the calculation, which may be provided by titration or other measurement techniques. Based upon such a calculation, the flow rate of the antimicrobial agent from the source of antimicrobial agent 710 to mixing assembly 714 can be adjusted and controlled by flow meter 740A and/or valve 738A to provide the desired antimicrobial concentration in chemical intervention processing solution 716. The flow rate of the alkaline agent from the source of alkaline agent 712 to mixing assembly 714 can be adjusted and controlled by flow meter 740B and/or valve 738B to provide the desired pH in chemical intervention processing solution 716. Preferably, the flow rate of the antimicrobial agent from the source of antimicrobial agent 710 to mixing assembly 714 is maintained at a constant flow rate by flow meter 740A and/or valve 738A and only adjusted upon new input of data. In some aspects, control assembly 790 is in electrical communication with flow meter 740A and/or valve 738A to provide the appropriate flow rate of the antimicrobial agent from the source of antimicrobial agent 710 to mixing assembly 714. In some aspects, control assembly 790 is in electrical communication with flow meter 740B and/or valve 738V to provide the appropriate flow rate of the alkaline agent from the source of alkaline agent 712 to mixing assembly 714. In certain aspects, such as shown in FIG. 7D, the chemical intervention processing solution 716 having the desired antimicrobial concentration and/or desired pH can be provided by mixing assembly 714 based upon calculation alone without monitoring the antimicrobial concentration and/or pH of the processing water and/or the resulting chemical intervention processing solution 716.

Ancillary system 714 can also have monitoring assembly 775 in electrical communication with control assembly 790. Monitoring assembly 775 generally comprises one or more probes or sensors monitoring antimicrobial concentration and/or pH. In the instance of monitoring the concentration of one or more peroxycarboxylic acids, such as peracetic acid, monitoring assembly 775 can comprise a suitable peracetic acid concentration sensor such as, for example, peracetic acid probes available from ProMinent® Dosiertechnik Gmbh of Heidelberg, Germany or Analytical Technology of Delph Saddleworth, United Kingdom.

As shown in FIGS. 7A-7C, recirculation loop 732 can be split prior to mixing assembly 718 to provide input stream 726 to mixing assembly 718 and analysis stream 770.

Analysis stream 770 of the processing water can be provided to antimicrobial meter 772 to measure the concentration of antimicrobial agent in the processing water, as shown in FIGS. 7A and 7C. Generally, a desired antimicrobial concentration within the analysis stream 770 will be targeted to be about 100 ppm to about 1000 ppm with an acceptable low/high fluctuation range from the desired antimicrobial concentration being from about −5% to about +20%, in some aspects about −4% to about +15%, in some aspects about −3% to about +10%.

In some aspects, an acceptable low fluctuation range below the desired antimicrobial concentration is between about −5% and less than about 0%, in some aspects between about −5% and about −1%, in some aspects between about −4% and less than about 0%, in some aspects between about −4% and about −2%, in some aspects between about −3% and less than about 0%, in some aspects between about −3% and about −2%, and in some other aspects between about −2% and less than about 0%.

In some aspects, the acceptable fluctuation above the desired antimicrobial concentration is between about 20% and greater than about 0%, in some aspects between about 20% and about 1%, in some aspects between about 15% and greater than about 0%, in some aspects between about 15% and about 2%, in some aspects between about 10% and greater than about 0%, in some aspects between about 10% and about 2%, in some aspects between about 5% and greater than about 0%, and in some other aspects between about 5% and about 1%.

As the antimicrobial meter 772 measures the antimicrobial concentration of the processing water via analysis stream 770, a signal 774, for example, a 4-20 mA analog signal, indicating the antimicrobial concentration level is sent from antimicrobial meter 772 to control assembly 790. In some aspects, antimicrobial meter 772 is a probe for measuring peracetic acid.

If the concentration of the antimicrobial agent, such as peracetic acid, within the processing water via analysis stream 770 is less than the targeted antimicrobial concentration level, control assembly 790 will direct the antimicrobial dosing assembly 705 to supply additional amounts of the source of antimicrobial agent 710 into mixing assembly 714 via flow meter 740A and/or modulating valve 738A, such as by increasing the flow rate. If the concentration of the antimicrobial agent within the processing water via analysis stream 770 is greater than the targeted antimicrobial concentration level, control assembly 790 will direct the antimicrobial dosing assembly 705 to decrease the flow rate, or shut off the supply, of the source of antimicrobial agent 710 into mixing assembly 714 via flow meter 740A and/or modulating valve 738A. In addition to, or in lieu of, adjusting the flow of antimicrobial agent 710 into mixing assembly, control assembly 790 may direct processing water supply assembly 720 to decrease or increase the flow of processing water into mixing assembly 718 to adjust the antimicrobial concentration level. By continually monitoring and real-time adjusting antimicrobial concentration levels in the processing water via analysis stream 770, the antimicrobial concentration of processing solution 716 within outlet line 728 of mixing assembly 714 is maintained close to the desired level and can continually be relied upon for use with downstream soaking, dipping, quenching, rinsing, spraying or washing systems for food processing applications.

Analysis stream 770 of the processing water can be provided to pH meter 776 to measure the pH of the processing water, as shown in FIGS. 7A-7B. Generally, a desired pH within the analysis stream 770 will be targeted to be greater than 6.5 and up to 13.5, in some aspects greater than 7.0 and up to 13.0, in some aspects between 7.5 and up to about 12.5, in some aspects between 7.5 and up to about 12.0, in some aspects between about 7.5 and 11.5, in some aspects between about 7.5 and about 11.0, and in some aspects between about 7.5 and about 10.0, with an acceptable low/high fluctuation range from the desired pH being about 0.1 to 3 pH units below the desired pH and about 0.1 to about 3 pH units above the desired pH.

In some aspects, an acceptable low fluctuation range below the desired pH is between about 3 and greater than 0 pH units less than the desired pH, in some aspects between about 2.5 and 0.5 pH units less than the desired pH, in some other aspects between about 2.0 and about 0.5 pH units less than the desired pH, and in some preferred aspects between about 1.5 and about 0.5 pH units less than the desired pH.

In some aspects, an acceptable high fluctuation range above the desired pH is between about 3 and greater than 0 pH units greater than the desired pH, in some aspects between about 2.5 and 0.5 pH units greater than the desired pH, in some other aspects between about 2.0 and about 0.5 pH units greater than the desired pH, and in some preferred aspects between about 1.5 and about 0.5 pH units greater than the desired pH.

As the pH meter 776 measures the pH of the processing water via analysis stream 770, a signal 778, for example, a 4-20 mA analog signal, indicating the pH is sent from pH meter 776 to control assembly 790. If the pH of the processing water via analysis stream 770 is less than the targeted pH level, control assembly 790 will direct the pH dosing assembly 707 to increase the flow rate of the source of alkaline agent 713 into mixing assembly 714 via flow meter 740B and/or modulating valve 738B. If the pH of the processing water via analysis stream 770 is greater than the targeted pH level, control assembly 790 will direct the pH dosing assembly 707 to decrease the flow rate, or turn off the supply, of the source of alkaline agent 713 into mixing assembly 714 via flow meter 740B and/or modulating valve 738B. In addition to, or in lieu of, adjusting the flow of alkaline agent 712 into mixing assembly, control assembly 790 may direct processing water supply assembly 720 to increase or decrease the flow of processing water into mixing assembly 718 to adjust pH levels in the processing solution. By continually monitoring and real-time adjusting the pH level in the processing water via analysis stream 770, the pH of the processing solution 716 within outlet line 728 of mixing assembly 714 is maintained close to the desired level and can continually be relied upon for use with downstream soaking, dipping, quenching, rinsing, spraying or washing systems for food processing applications.

In some aspects, a portion of analysis stream 770 of the processing water can be provided to antimicrobial meter 772 to measure the antimicrobial concentration and pH meter 776 to measure the pH of the processing water. In some aspects, a separate portion of analysis stream 770 is provided to antimicrobial meter 772 than to pH meter 776.

The sample of processing water from analysis stream 770 used by antimicrobial meter 772 and/or PH meter 774 of monitoring assembly 775 may be sent to drain 780 whereby the rest of analysis stream 770 continues to flow. After passing antimicrobial meter 772 and/or PH meter 774, analysis stream 770 may be provided back to the processing water stream provided to mixing assembly 718, provided to a drain, used as make-up water, or returned to tank 730 via feedback line 771 as shown in FIG. 7E.

As shown in FIGS. 7A-7D, control assembly 790 can also communicate with pump 722, such as by signal 722S, to adjust the flow rate of the processing water provided to mixing assembly 718. As shown in FIGS. 7A and 7C, control assembly 790 can communicate with valve 738A, such as by signal 738AS, and/or flow meter 740A, such as by signal 740AS, to adjust the flow rate of the source of antimicrobial agent 710 provided to mixing assembly 718 via antimicrobial agent input line 711. As in FIGS. 7A-7B, control assembly 790 can communicate with valve 738B, such as by signal 738BS, and/or flow meter 740B, such as by signal 749BS, to adjust the flow rate of the source of antimicrobial agent 710 provided to mixing assembly 718 via antimicrobial agent input line 711.

As shown in FIG. 7E, level sensor 742 can send signal 744 to control assembly 790 indicating the volume of processing water in tank 730. Based upon the measured volume level from signal 744, control assembly 790 can communicate with one or more pumps, one or more valves and/or one or more flow meters to adjust the flow rate of make-up water provided into tank 730. For instance, control assembly 790 can communicate with valve 738C, such as by signal 738CS, and/or flow meter 740C, such as by signal 740CS, to adjust the flow rate of the make-up water provided into tank 730.

While FIG. 7A illustrates antimicrobial meter 772 and PH meter 776 in relation to analysis stream 770, one or more probes or sensors monitoring pH and/or antimicrobial concentration may also be used in other areas of poultry processing system 700 in addition to, or instead of, antimicrobial meter 772 and/or pH meter 776 in relation to analysis stream 770. FIG. 7B illustrates only pH meter 776 in relation to analysis stream 770, FIG. 7C illustrates only antimicrobial meter 772 in relation to analysis stream 770, and FIG. 7D illustrates neither antimicrobial meter 772 nor pH meter 776 in relation to analysis stream 770. As it relates to FIGS. 7B-7D, the respective antimicrobial concentration and/or pH of the processing water is either not measured in analysis stream 770, measured in another location of processing system 700, or not measured at all, such as in the foregoing embodiment where the flow rate of the antimicrobial agent and/or flow rate of the alkaline agent is calculated.

In another instance, the antimicrobial concentration and/or pH may be measured proximate downstream outlet line 750 in addition to analysis stream 770. Such measurement may occur in downstream outline line 750 or an analysis stream off of downstream outline line 750. In some alternative aspects, the antimicrobial concentration and/or pH may be measured proximate downstream outlet line 750, such that there is no analysis stream 770 for conducting such measurements.

The antimicrobial concentration and/or pH may also be measured proximate tank 730 in addition to analysis stream 770 and/or downstream outlet line 750. Such measurement may occur within tank 730 or an analysis stream off of inlet stream 736. In some alternative aspects, the antimicrobial concentration and/or pH may be measured proximate tank 730, such that measurements are not conducted within analysis stream 770 and/or downstream outlet line 750.

The antimicrobial concentration and/or pH may also be measured proximate the output of mixing assembly 728 and before tank 730 in addition to analysis stream 770, downstream outlet line 750 and/or within tank 730. Such measurement may occur in inlet stream 736 or an analysis stream off of inlet stream 736.

In some alternative aspects, the antimicrobial concentration and/or pH may be measured proximate the output of mixing assembly 728 and before tank 730, such that measurements are not conducted within analysis stream 770, downstream outlet line 750 and/or within tank 730. For instance, in embodiments where tank 730 is not utilized after mixing assembly 714, the antimicrobial concentration and/or pH may be measured proximate the output of mixing assembly 728 using antimicrobial meter 772 and/or PH meter 776, respectively.

The flow rate of the processing water proximate mixing assembly 714 is between about 25 gallons-per-minute (gpm) to about 400 gpm, in some aspects between about 40 gpm and about 350 gpm, and in some preferred aspects between about 50 gpm and about 300 gpm. In some aspects, a flow rate of the processing solution 716 resulting from the mixing assembly 714 is about the same as the flow rate of the processing water prior to the mixing assembly 714.

The flow rate of processing solution 716 leaving tank 730 via downstream outlet line 750 is between about 25 gpm to about 400 gpm, in some aspects between about 40 gpm and about 350 gpm, and in some preferred aspects between about 50 gpm and about 300 gpm. In some aspects, a flow rate of the processing solution 716 leaving tank 730 is about the same as the flow rate of the processing water entering tank 730 via make-up water inlet line 752.

Mixing assembly 714 can also be in fluid communication with other components of the food processing system 700, including one or more storage tanks, one or more intermediate piping assemblies, one or more mixing tanks, one or more processing tanks, one or more mixers, one or more static mixers, and/or one or more heat exchangers. In certain embodiments antimicrobial agent comprises one or more peroxycarboxylic acids having from 2 to 12 carbon atoms. In some aspects, the one or more peroxycarboxylic acid is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and mixtures thereof. In some preferred aspects, the antimicrobial agent comprises peroxyacetic acid, peroxylactic acid, or a mixture thereof. In some preferred aspects, the antimicrobial agent comprises peroxyacetic acid. In some other preferred aspects, the antimicrobial agent comprises peroxylactic acid.

In some aspects, the pH adjustment product is an alkalizing agent approved for direct food contact. In some aspects, the alkalizing agent is chosen from alkali metals and alkali earth metals, including sodium hydroxide and/or potassium hydroxide and/or the sodium and/or potassium salts of carbonic acid and/or phosphoric acid and/or silicic acid and/or other alkaline chemistries. In some aspects, the alkaline agent comprises sodium hydroxide, potassium hydroxide, or a mixture thereof.

In some aspects, the chemical intervention processing solution, such as in tank 730 or in the inlet or red water recirculation loop, prior to introduction into the processing tank has a pH above 7.0 and below 10, in other aspects between about 7.5 and about 9.5 and in other aspects between about 7.2 and 8.6.

In some aspects, processing solution has a pH greater than 6.5, in some aspects greater than about 7.0, in some aspects greater than about 7.5, in some aspects greater than about 8.0, in some aspects greater than about 8.5, and in some other aspects greater than about 9.0. In some aspects, processing solution has a pH up to about 13.5, in some aspects up to about 13.0, in some aspects up to about 12.5, in some aspects up to about 12.0, in some aspects up to about 11.5, in some aspects up to about 11.0, in some aspects up to about 10.5, in some aspects up to about 10.0, and in some aspects up to about 9.5. In some aspects, processing solution has a pH greater than 6.5 and up to about 13.5, in some aspects greater than 7.0 and up to about 13.0, in some aspects between about 7.5 and 12.0, in some aspects between about 5.5 and about 11.5, in some aspects between about 7.5 and about 11.0, in some aspects between about 7.5 and about 10.5, and in some aspects between about 7.5 and about 10.0.

In some aspects, the antimicrobial agent comprises one or more peroxycarboxylic acids. In some aspects, the antimicrobial agent is a concentrated solution. In some aspects, the antimicrobial agent is a concentrated solution of one or more peroxycarboxylic acids having a concentration between about 1000 ppm and about 375,000 ppm, in some aspects between about 10,000 ppm and about 350,000 ppm, in some aspects between about 50,000 ppm and about 350,000 ppm, in some aspects between about 100,000 ppm and about 350,000 ppm, in some aspects between about 150,000 ppm and about 350,000 ppm, in some other aspects between about 200,000 ppm and about 350,000 ppm, in some other aspects between about 240,000 ppm and about 350,000 ppm, in some aspect between about 1000 ppm and about 240,000 ppm, in some aspects between about 10,000 ppm and about 240,000 ppm, in some aspects between about 50,000 ppm and about 240,000 ppm, in some aspects between about 100,000 ppm and about 240,000 ppm, in some aspects between about 150,000 ppm and about 240,000 ppm, and in some other aspects between about 200,000 ppm and about 240,000 ppm. In some aspects, the concentrated solution of one or more peroxycarboxylic acids comprises peracetic acid.

In certain aspects, the resulting chemical intervention processing solution has a concentration of peroxycarboxylic acid from about 1 ppm to about 5000 ppm, in some aspects between about 5 ppm and about 2500 ppm, in some aspects between about 10 ppm and about 2000 ppm, in some aspects between about 25 ppm and about 1500 ppm, in some aspects between about 50 ppm and about 1250 ppm, and in some other aspects between about 100 ppm and about 1000 ppm. In some aspects, the processing solution comprises peracetic acid.

In some other aspects, the processing solution has a concentration of peroxycarboxylic acid preferably from about 5 ppm to about 1000 ppm, preferably from about 10 ppm to about 200 ppm, and more preferably from about 15 ppm to about 100 ppm. In some aspects, the concentration of active peroxycarboxylic acid in the processing solution is from about 1 ppm to about 5000 ppm, preferably from about 5 ppm to about 1000 ppm, preferably from about 10 ppm to about 200 ppm, and more preferably from about 15 ppm to about 100 ppm. In some other aspects, the concentration of active peroxycarboxylic acid and active peroxycarboxylic acid ion in the processing solution is from about 1 ppm to about 5000 ppm, preferably from about 5 ppm to about 1000 ppm, preferably from about 10 ppm to about 200 ppm, and more preferably from about 15 ppm to about 100 ppm. In some aspects, the concentration of the PAA in the processing solution is between about 15 ppm and about 100 ppm, preferably between about 15 ppm and about 75 ppm, and in some other aspects between about 20 ppm and 50 ppm.

In some aspects, the resulting chemical intervention processing solution 716 from the mixing assembly 714 comprises one or more peroxycarboxylic acids. In some aspects, the concentration of the one or more peroxycarboxylic acids in the processing solution 716 from the mixing assembly 714 is between about 1 ppm and about 5000 ppm, in some aspects between about 5 ppm and about 2500 ppm, in some aspects between about 10 ppm and about 2000 ppm, in some aspects between about 25 ppm and about 1500 ppm, in some aspects between about 40 ppm and about 1250 ppm, and in some other aspects between about 50 ppm and about 1000 ppm. In some aspects, the processing solution 716 from the mixing assembly 714 comprises peracetic acid.

In some aspects, the chemical invention processing solution 716 from the mixing assembly 714 comprises peracetic acid. In some aspects, the concentration of peracetic acid in the processing solution 716 from the mixing assembly 714 is between about 1 ppm and about 5000 ppm, in some aspects between about 5 ppm and about 2500 ppm, in some aspects between about 10 ppm and about 2000 ppm, in some aspects between about 25 ppm and about 1500 ppm, in some aspects between about 40 ppm and about 1250 ppm, and in some other aspects between about 50 ppm and about 1000 ppm.

In some aspects, the chemical invention processing solution 716 from the mixing assembly 714 is diluted with a source of water to a desired processing antimicrobial concentration prior to being used in a poultry processing application 760. In some aspects, the desired processing antimicrobial concentration is from about 1 ppm to about 2500 ppm, preferably from about 5 ppm to about 1000 ppm, preferably from about 10 ppm to about 500 ppm. and more preferably from about 15 ppm to about 100 ppm.

In certain aspects, the poultry tank design of the present invention having at least a first and a second processing stream is capable of maintaining less than about a 10 ppm concentration gradient across the processing length of a processing tank, in some aspects less than about an 8 ppm concentration gradient, less than about 6 ppm concentration gradient, less than about 5 ppm concentration gradient, less than about 4 ppm concentration gradient, and in other aspects less than about a 3 ppm concentration gradient across the processing length of the processing tank. In certain aspects, the concentration gradient across the processing length of the processing tank of the present invention is between about 1 ppm and about 10 ppm, between about 2 ppm and 8 ppm, and in some other aspects between about 3 ppm and 5 ppm.

While this disclosure contained certain portions relating to poultry processing, the chemical intervention processing solution 716 may be utilized in various food processing applications, including red meat (beef, lamb, bison and the like), poultry (chicken, turkey, duck, goose, pheasant, and the like), freshwater and ocean seafood and fish (shrimp, lobster, crab, oysters, clams, mussels, scallops, tuna, salmon, cod, walleye, roe and the like), produce (fruits and vegetables) and nuts.

EXAMPLES

Testing—Side Stream

Figure 5A:
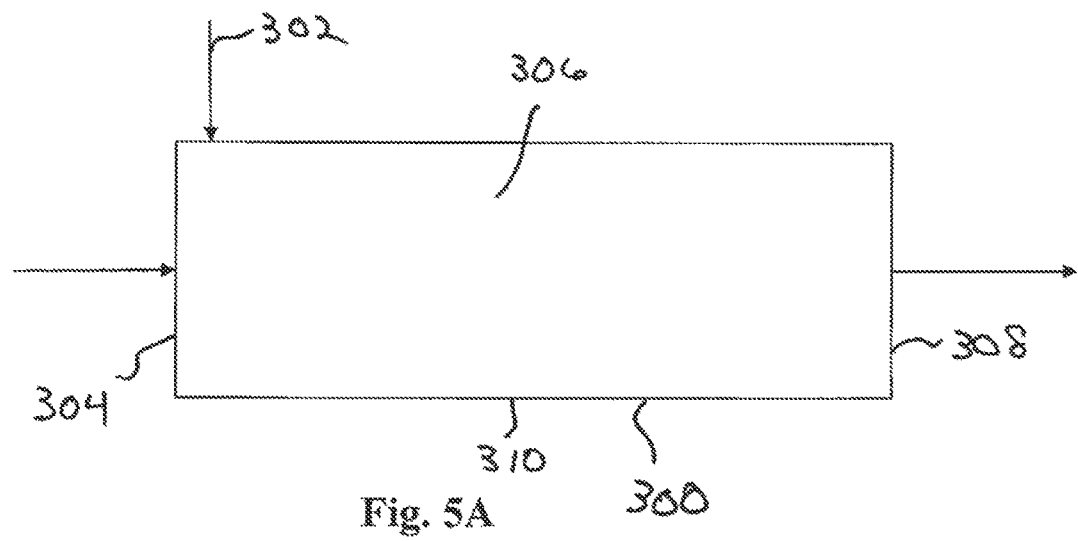
FIG. 5A is schematic illustration of a poultry carcass water chiller tank according to the prior art.
Figure 5B:
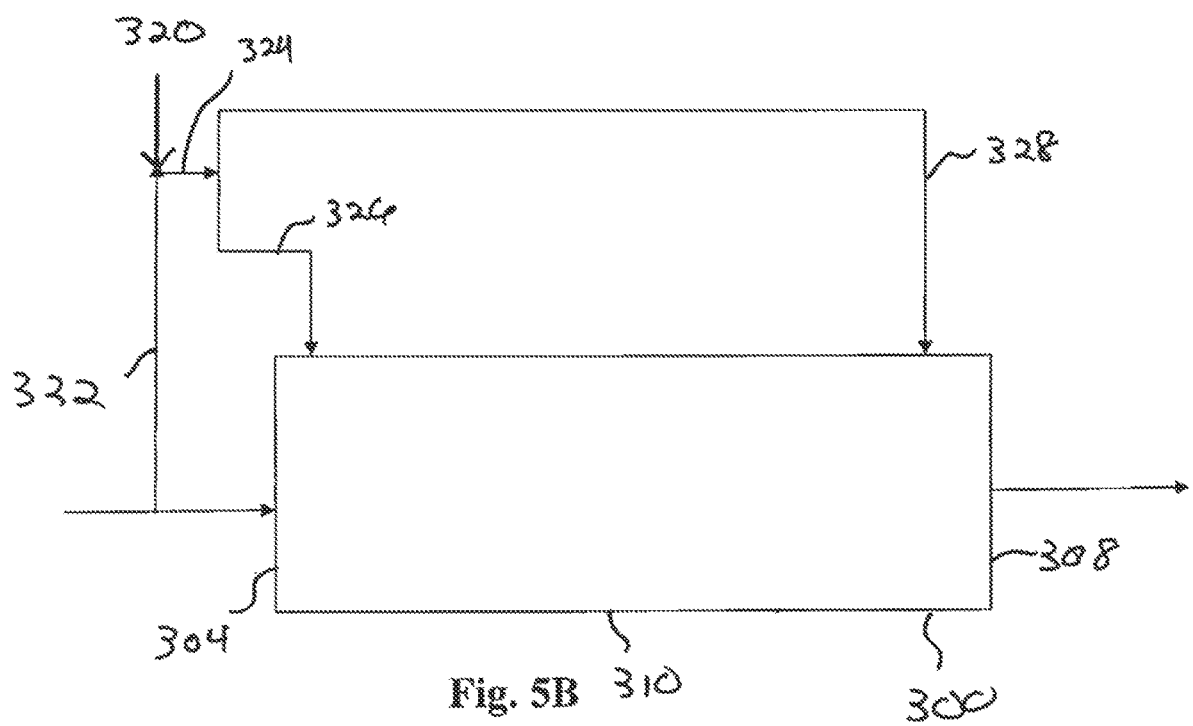
FIG. 5B is a schematic illustration of a poultry carcass water chiller tank according to a representative embodiment of the present invention.

In order to evaluate the efficacy of the present invention, a test was conducted to compare the performance of a conventional poultry chiller tank as represented by FIG. 5A and an improved poultry chiller tank utilizing a side stream to introduce an antimicrobial agent as represented by FIG. 5B. In each case, an antimicrobial agent comprising PAA was introduced into a poultry chiller tank 300 with a target PAA concentration of 30 ppm in the poultry chiller tank 300. Poultry chiller tank 300 comprised a 65 foot long tank with a volume of 40,000 gallons. Poultry chiller tank 300 had a poultry carcass load of greater than 34,000 and the carcass processing rate was the same for both tests.

With the conventional poultry chiller tank as represented by FIG. 5A, a concentrated antimicrobial solution 302 was added at a carcass introduction end 304 of the poultry chiller tank 300. In the present case, antimicrobial solution 302 comprised a solution of water and PAA. During a production shift, samples of a chiller tank solution 306 were taken at the carcass introduction end 304, a carcass removal end 308 and a chiller tank midpoint 310. The time weighted average of 5 samples at each location were:

Carcass Introduction End: 35 ppm
Chiller Tank Midpoint: 26 ppm
Carcass Removal End: 15 ppm As can be seen in the sample measurements, a significant length of poultry chiller tank 300 experienced concentrations of PAA significantly below the desired level of 30 ppm. More specifically, poultry carcasses near that carcass removal end 308 were exposed to chiller tank solution having half of the desired concentration of PAA. The carcass introduction end 304 experienced a slightly higher level of PAA due to the injection of the concentrated antimicrobial solution 302 as well as PAA carryover on poultry carcasses from the prior processing step.

With the poultry chiller tank design of the present invention as show in FIG. 5B, a PAA solution 320 is introduced and mixed into a side stream 322 to form a processing solution 324 having a PAA concentration of 30 ppm. Processing solution 324 comprised a first processing solution 326 that was introduced into the chiller tank 300 at the carcass introduction end 304 while a second processing solution 328 was introduced into the chiller tank 300 at the carcass removal end 308. During a production shift, samples of the chiller tank solution 306 were taken at the carcass introduction end 304, the carcass removal end 308 and the chiller tank midpoint 310. The time weighted average of 5 samples at each location were:

Carcass Introduction End: 32 ppm
Chiller Tank Midpoint: 28 ppm
Carcass Removal End: 27 ppm As can be seen in the sample measurements, the poultry chiller tank design of the present invention had a much lower concentration gradient across the length of the poultry chiller tank 300 with the chiller tank solution 306 at the chiller tank midpoint 310 and carcass removal end 308 being much closer to the desired concentration level of 30 ppm. As measured, the poultry chiller tank design of the present invention is capable of maintaining plus or minus 3 ppm of PAA within the chiller tank solution 306 across the length of the poultry chiller tank 300.

While the design illustrated in 5B utilized introduction of only a first processing solution 326 and a second processing solution 328, processing solution 324 can be further divided into additional processing solution streams that can be introduced at additional locations within the poultry chiller tank 300. For example, processing solution 324 could be further divided into a third processing solution also having a PAA concentration of 30 ppm and said third processing solution could be introduced, for example, at the chiller tank midpoint 310.

Figure 6:
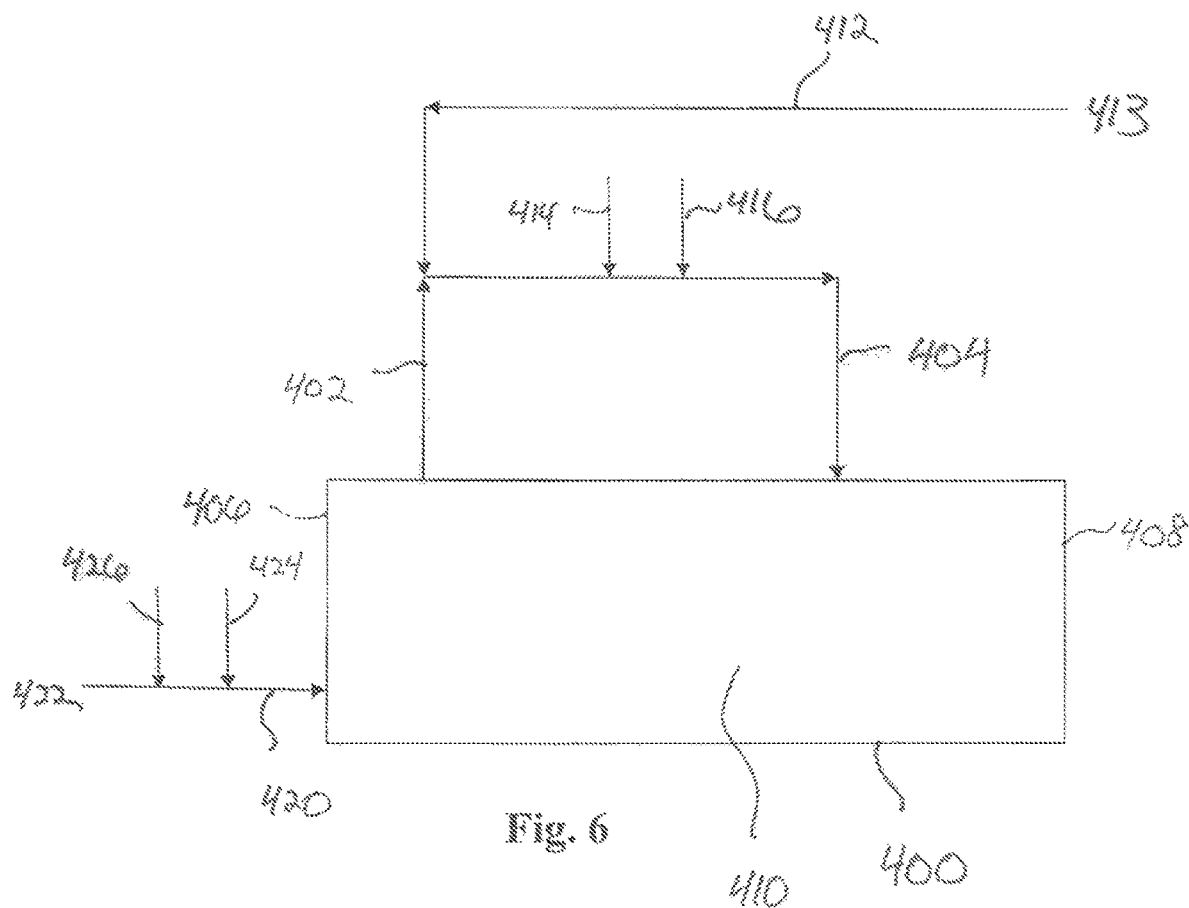
FIG. 6 is a schematic illustration of a poultry carcass water chiller tank according to a representative embodiment of the present invention.

Another representative embodiment of a poultry chiller tank 400 is illustrated generally in FIG. 6. In a manner similar to the previously described embodiments, poultry chiller tank 400 can include a recirculation line 402 for introducing a PAA solution 404 to one or more locations of the poultry chiller tank 400 between a carcass introduction end 406 and a carcass removal end 408. In addition to recirculating a tank solution 410 from the poultry chiller tank 400, a downstream processing stream 412 can be used to supply make-up water through the recirculation line 402. Downstream processing stream 412 can comprise an aqueous solution that can include an anti-microbial component, such as PAA, from a downstream operation 413, for example, a de-boning station or final rinse/bath prior to packaging, wherein the organic load is reduced as compared to the upstream poultry chiller tank 400. Recirculation line 402 can comprise a recirculation pH adjustment stream 414 as well as a recirculation PAA adjustment stream 416 such that the PAA solution 404 has a desired PAA concentration, for example, between 15 ppm and about 100 ppm, preferably between about 15 ppm and about 75 ppm, and in some other aspects between about 20 ppm and 50 ppm. In addition, poultry chiller tank 400 can comprise another source of PAA solution, for example, a fresh PAA solution 420. Fresh PAA solution 420 can comprise a tank or piping system where a source of fresh or otherwise filtered water 422 is adjusted with a fresh PAA adjustment stream 424 and/or a fresh pH adjustment stream 426 such that the fresh PAA solution 420 has a desired PAA concentration that is substantially equivalent to PAA solution 404. Through the introduction of both PAA solution 404 and fresh PAA solution 420 having equivalent PAA concentrations, the PAA concentration gradient within the poultry chiller tank 400 can be reduced.

Testing—PAA Meter Feedback

In order to evaluate the efficacy of the present invention, a test was conducted to evaluate the efficacy of monitoring a peroxycarboxylic acid concentration of a processing solution to maintain a desired antimicrobial concentration. In this test example, the peroxycarboxylic acid used to dose the processing water was peracetic acid. The desired antimicrobial concentration of peracetic acid in the processing solution was set at various values from 200 ppm up to 1550 ppm, as shown below in Table 1. The flow rate of the processing water provided to a mixing assembly, particularly a venturi injector, was about 100 gpm. The flow rate of the source of peracetic acid provided to the mixing assembly was initially determined by calculation and provided to a control assembly, such as that shown in FIGS. 7A-7D, which provided the calculated flow rate of the peracetic acid to the mixing assembly. The source of the peracetic acid had a concentration of about 220,000 ppm, with a flow rate ranging from about 2.7 gph to about 54.6 gph based upon the desired peracetic acid concentration. The evaluation was performed at each desired peracetic acid concentration for a period of about 10 minutes, starting from 200 ppm and then progressing in concentration up to 1550 ppm. The PAA meter provided a real-time concentration measurement to the control assembly, which sent a signal to a flow meter and/or modulating valve to increase, decrease or maintain the flow rate of the source of peracetic acid to the mixing assembly based upon the measured peracetic acid concentration in relation to the desired peracetic acid concentration.

Table 1 below shows the target peracetic acid concentration for the resulting processing solution exiting the mixing assembly, the lowest monitored peracetic acid concentration accounting for a proper period of time for the mixing assembly to increase the flow rate to the desired concentration, and a highest monitored peracetic acid concentration.

TABLE 1

PAA Monitoring and Feedback Control

| Target PAA (ppm) | Ave. (ppm) | Ave. (%) | Low Value (ppm) | Low Value (%) | High Value (ppm) | High Value (%) |
|---|---|---|---|---|---|---|
| 200 | 200.04 | +0.02 | 196.16 | −1.92 | 209.55 | +4.78 |
| 250 | 252.72 | +1.09 | 248.23 | −0.71 | 258.87 | +3.55 |
| 500 | 508.63 | +1.73 | 491.46 | −1.71 | 523.01 | +4.60 |
| 550 | 543.85 | −1.11 | 536.02 | −2.54 | 556.55 | +1.19 |
| 1500 | 1479.57 | −1.36 | 1462.2 | −2.52 | 1496.7 | −0.22 |
| 1550 | 1548.91 | −0.07 | 1508.9 | −2.65 | 1547.6 | −0.15 |

As provided from the data in Table 1, the mixing assembly was able to provide a processing solution having an average concentration that was within 2%, in some aspects within 1.5%, in some aspects within 1.0%, and in some aspects within 0.5%, of the target concentration. The mixing assembly was also able to minimize the fluctuations in concentration, such that the concentration of the peracetic acid in the processing solution was within −3% and up to within +5% of the desired peracetic acid concentration for the entire target value range between 200 ppm and 1550 ppm.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

What is claimed:

1. A system for providing a processing solution to a processing tank for use in a food product processing application, the system comprising:
    a mixing assembly in fluid communication with an inlet stream comprising processing water, an antimicrobial dosing stream comprising an antimicrobial agent, and a processing tank via an outlet stream, wherein the mixing assembly is configured to mix the inlet stream and the antimicrobial dosing stream to provide the outlet stream comprising a premixed processing solution having a desired concentration of the antimicrobial agent and a desired pH; and wherein the premixed processing solution is configured to be fed from the mixing assembly to the processing tank, the mixing assembly located outside of the processing tank;
    a processing water supply assembly in fluid communication with the mixing assembly via the inlet stream, wherein the processing water supply assembly provides a flow of processing water to the mixing assembly, wherein the flow of processing water provided to the mixing assembly comprises a recirculated processing solution from the processing tank via a recirculation line, the recirculated processing solution having a residual concentration of the antimicrobial agent;
    an alkaline agent assembly in fluid communication with the flow of processing water, wherein the alkaline agent assembly is configured to add an alkaline agent to the flow of processing water to provide the processing water at a desired pH within the mixing assembly;
    an antimicrobial dosing assembly in fluid communication with the mixing assembly via the antimicrobial dosing stream, wherein the antimicrobial dosing assembly is configured to control a flow rate of the antimicrobial dosing stream to the mixing assembly;
    a monitoring system configured to measure the residual concentration of the antimicrobial agent of the recirculated processing solution from an analysis stream in fluid communication with the recirculation line prior to the mixing assembly; and
    a control assembly in electrical communication with the processing water supply assembly and the antimicrobial dosing assembly, wherein the processing water supply assembly is configured to be selectively operated by the control assembly to control the flow rate of the processing water to the mixing assembly to provide the processing solution at the desired pH, and wherein the antimicrobial dosing assembly is configured to be selectively operated by the control assembly to control the flow rate of the antimicrobial dosing stream to the mixing assembly to provide the processing solution at the desired concentration.

2. The system of claim 1, wherein the monitoring system is configured to measure the concentration of the antimicrobial agent in the processing solution of the outlet stream after the mixing assembly, and wherein the monitoring system is configured to transmit at least one signal relating to the measured concentration of the antimicrobial agent.

3. The system of claim 2, wherein the control assembly is configured to receive the at least one signal from the monitoring system relating to the measured concentration of the antimicrobial agent and determine whether the measured concentration of the antimicrobial agent is between a lower threshold concentration level and an upper threshold concentration level of the desired concentration of the antimicrobial agent by comparing the measured concentration of the antimicrobial agent to the lower and upper threshold concentration levels.

4. The system of claim 3, wherein the antimicrobial dosing assembly is configured to be selectively operated by the control assembly to increase the flow rate of the antimicrobial dosing stream to the mixing assembly when the measured concentration of the antimicrobial agent is below the lower threshold concentration level or decrease the flow rate of the antimicrobial dosing stream to the mixing assembly when the measured concentration of the antimicrobial agent is above the upper threshold concentration level.

5. The system of claim 4, wherein the antimicrobial agent comprises at least one peroxycarboxylic acid, and wherein the desired concentration of the antimicrobial agent of the at least one peroxycarboxylic acid is between about 10 ppm and about 2500 ppm.

6. The system of claim 5, wherein the lower threshold antimicrobial concentration level is in a range from greater than 0% to about 5% less than the desired concentration of the antimicrobial agent.

7. The system of claim 6, wherein the upper threshold antimicrobial concentration level is in a range from greater than 0% to about 20% greater than the desired concentration of the antimicrobial agent.

8. The system of claim 7, wherein the at least one peroxycarboxylic acid comprises peracetic acid.

9. The system of claim 8, wherein the desired concentration of peracetic acid is between about 100 ppm and about 1000 ppm.

10. The system of claim 5, wherein a concentration of the antimicrobial dosing stream provided to the mixing assembly is between about 1000 ppm and about 375,000 ppm.

11. The system of claim 10, wherein a source of the antimicrobial agent is provided in a container or generated on-site.

12. The system of claim 1, wherein the monitoring system is configured to measure the pH of the processing water prior to the mixing assembly, the pH of the processing solution after the mixing assembly, or a combination thereof, and wherein the monitoring system is configured to transmit at least one signal relating to the measured pH.

13. The system of claim 12, wherein the control assembly is configured to receive the at least one signal from the monitoring system relating to the measured pH and determine whether the measured pH is between a lower threshold pH level and an upper threshold pH level of the desired pH by comparing the measured pH to the lower and upper threshold pH levels.

14. The system of claim 13, wherein the alkaline dosing assembly is configured to be selectively operated by the control assembly to increase the flow rate of the alkaline dosing stream to the mixing assembly when the measured pH is below the lower threshold pH level or decrease the flow rate of the alkaline dosing stream to the mixing assembly when the measured pH is above the upper threshold pH level.

15. The system of claim 14, wherein the desired pH of the processing solution is greater than 6.5 and up to about 13.5.

16. The system of claim 15, wherein the lower threshold pH level is in a range from greater than 0 pH units to about 2 pH units less than the desired pH.

17. The system of claim 16, wherein the upper threshold pH level is in a range from greater than 0 pH units to about 2 pH units greater than the desired pH.

18. The system of claim 1,
wherein the monitoring system is configured to measure the pH of the processing water prior to the mixing assembly, the pH of the processing solution after the mixing assembly, or a combination thereof; and
wherein the monitoring system is configured to transmit at least one signal relating to the measured pH.

19. The system of claim 18, wherein the control assembly is configured to receive the at least one signal from the monitoring assembly relating to the measured concentration of the antimicrobial agent and determine whether the measured concentration of the antimicrobial agent is between a lower threshold concentration level and an upper threshold concentration level of the desired concentration of the antimicrobial agent by comparing the measured concentration of the antimicrobial agent to the lower and upper threshold concentration levels, and wherein the antimicrobial dosing assembly is configured to be selectively operated by the control assembly to increase the flow rate of the antimicrobial dosing stream to the mixing assembly when the measured concentration of the antimicrobial agent is below the lower threshold concentration level or decrease the flow rate of the antimicrobial dosing stream to the mixing assembly when the measured concentration of the antimicrobial agent is above the upper threshold concentration level.

20. The system of claim 19, wherein the control assembly is configured to receive the at least one signal from the monitoring system relating to the measured pH and determine whether the measured pH is between a lower threshold pH level and an upper threshold pH level of the desired pH by comparing the measured pH to the lower and upper threshold pH levels, and wherein the alkaline dosing assembly is configured to be selectively operated by the control assembly to increase the flow rate of the alkaline dosing stream to the mixing assembly when the measured pH is below the lower threshold pH level or decrease the flow rate of the alkaline dosing stream to the mixing assembly when the measured pH is above the upper threshold pH level.

21. The system of claim 20, wherein the antimicrobial agent comprises at least one peroxycarboxylic acid, and wherein the desired concentration of the at least one peroxycarboxylic acid is between about 10 ppm and about 2500 ppm.

22. The system of claim 21, wherein the lower threshold antimicrobial concentration level is in a range from greater than 0% to about 5% less than the desired concentration of the antimicrobial agent, and wherein the upper threshold antimicrobial concentration level is in a range from greater than 0% to about 20% greater than the desired concentration of the antimicrobial agent.

23. The system of claim 22, wherein the at least one peroxycarboxylic acid comprises peracetic acid.

24. The system of claim 23, wherein the desired concentration of peracetic acid is between about 100 ppm and about 1000 ppm.

25. The system of claim 24, wherein a concentration of the antimicrobial dosing stream provided to the mixing assembly is between about 1500 ppm and about 375,000 ppm.

26. The system of claim 20, wherein the mixing assembly comprises at least one Venturi injector.

27. The system of claim 26, wherein the control assembly is in electrical communication with the processing water supply assembly, and wherein the processing water supply assembly is configured to be selectively operated by the control assembly to increase or decrease the flow of the inlet stream to the at least one Venturi injector.

28. The system of claim 27, wherein the processing water supply assembly is configured to be selectively operated by the control assembly to decrease the flow of the inlet stream to the at least one Venturi injector when the measured concentration of the antimicrobial agent is below the lower threshold concentration level.

29. The system of claim 27, wherein the processing water supply assembly is configured to be selectively operated by the control assembly to increase the flow of the inlet stream to the at least one Venturi injector when the measured concentration of the antimicrobial agent is above the upper threshold concentration level.

30. The system of claim 1, wherein the outlet stream is in fluid communication with the processing tank, a storage tank, a processing line, an intermediate storage tank prior to the processing tank, an intermediate piping assembly prior to the processing tank, a processing line prior to the processing tank, or a processing line prior to a storage tank.

31. The system of claim 1, wherein the recirculation line is in fluid communication with a storage tank, wherein the recirculation line is fed into the storage tank prior to the recirculated processing solution being fed to the mixing assembly.

32. The system of claim 31, wherein the monitoring system is configured to measure the concentration of the antimicrobial agent of an analysis stream of the processing solution after the mixing assembly.

33. The system of claim 31, wherein the monitoring system is configured to measure the concentration of the antimicrobial agent of the processing solution within the storage tank.

34. The system of claim 31, wherein the storage tank provides a source of the processing water to the processing water supply assembly.

35. The system of claim 34, wherein the storage tank comprises a make-up water source inlet to replenish the processing water to the storage tank, wherein the make-up water source is chosen from a fresh water source, reclaimed water source, reused water source, recycled water source, red water source, or a combination thereof.

36. The system of claim 1, wherein a flow rate of the processing water proximate the mixing assembly is between about 40 gpm and about 350 gpm.

37. The system of claim 1, wherein the premixed processing solution is provided to an intermediate storage tank having a volume greater than about 20 gallons up to about 100,000 gallons before being provided to a food processing application, wherein a flow rate of the premixed processing solution exiting the intermediate storage tank is between about 40 gpm and about 350 gpm.

38. The system of claim 37, wherein mixing assembly is a Venturi injector, and wherein the flow rate of the premixed processing solution exiting the intermediate storage tank is about the same as the flow rate of the processing water proximate the Venturi injector.

39. The system of claim 1, wherein the antimicrobial agent comprises at least one peroxycarboxylic acid chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and combinations and mixtures thereof.

* * * * *